(12) United States Patent
Nussbaum

(10) Patent No.: US 12,414,599 B2
(45) Date of Patent: Sep. 16, 2025

(54) LACE ADJUSTER ASSEMBLY INCLUDING FEEDBACK ASSEMBLY FOR USE IN VISUALIZING AND MEASURING ATHLETIC PERFORMANCE

(71) Applicant: LACECLIP LLC, Miami Beach, FL (US)

(72) Inventor: Jonathan Nussbaum, Miami Beach, FL (US)

(73) Assignee: LACECLIP LLC, Miami Beach, FL (US)

( * ) Notice: Subject to any disclaimer, the term of this patent is extended or adjusted under 35 U.S.C. 154(b) by 0 days.

(21) Appl. No.: 18/444,515

(22) Filed: Feb. 16, 2024

(65) Prior Publication Data
US 2024/0277105 A1 Aug. 22, 2024

Related U.S. Application Data

(63) Continuation-in-part of application No. 18/110,817, filed on Feb. 16, 2023, now Pat. No. 12,144,397, and
(Continued)

(51) Int. Cl.
*A43B 3/34* (2022.01)
*A43C 1/06* (2006.01)
(Continued)

(52) U.S. Cl.
CPC ............... *A43B 3/34* (2022.01); *A43C 1/06* (2013.01); *A43C 7/00* (2013.01); *A43C 7/08* (2013.01);
(Continued)

(58) Field of Classification Search
CPC .... A43B 3/34; A43C 1/06; A43C 7/00; A43C 7/08; A45F 5/02; A45F 2005/023
See application file for complete search history.

(56) References Cited

U.S. PATENT DOCUMENTS 1,879,475 A * 9/1932 Poon .................. A43C 7/08
24/712.9
4,622,723 A * 11/1986 Krauss ................ F16G 11/101
24/136 R
(Continued)

FOREIGN PATENT DOCUMENTS

| CN | 101185535 A1 | 5/2008 |
| CN | 101367011 A | 2/2009 |

(Continued)

OTHER PUBLICATIONS

International Search Report and Written Opinion, PCT Application Serial No. PCT/US2024/016203, dated Jun. 26, 2024, issued by International Search Authority US.
(Continued)

*Primary Examiner* — Jason W San
*Assistant Examiner* — Matthew J Sullivan
(74) *Attorney, Agent, or Firm* — ROEDER & BRODER LLP; Steven G. Roeder

(57) ABSTRACT

A lace adjuster system for selectively adjusting shoelaces (12) of shoes (10A, 10B) of a user, including a first lace adjuster assembly (13) for use with the first shoe (10A) and a second lace adjuster assembly (13) for use with the second shoe (10B). Each lace adjuster assembly (13) includes (i) a lace adjuster (14); and (ii) a feedback assembly (15) that is mechanically coupled to the lace adjuster (14), the feedback assembly (15) selectively measuring statistical data of the user during an athletic performance, the feedback assembly (15) including a sensor assembly (216) that senses a performance characteristic of the user during the athletic performance; and a controller (360) that receives the performance characteristic and generates a statistical data point that is based at least in part on the performance character-
(Continued)

istic. The statistical data points can be combined to generate a combined statistical data point having enhanced accuracy.

20 Claims, 11 Drawing Sheets

Related U.S. Application Data a continuation-in-part of application No. 17/354,655, filed on Jun. 22, 2021, now Pat. No. 11,937,666, said application No. 18/110,817 is a continuation of application No. 16/690,908, filed on Nov. 21, 2019, which is a continuation of application No. 15/301,946, filed as application No. PCT/US2015/025763 on Apr. 14, 2015, now Pat. No. 10,595,581.

(60) Provisional application No. 63/446,546, filed on Feb. 17, 2023, provisional application No. 63/042,401, filed on Jun. 22, 2020, provisional application No. 62/043,822, filed on Aug. 29, 2014, provisional application No. 62/018,194, filed on Jun. 27, 2014, provisional application No. 61/979,491, filed on Apr. 14, 2014.

(51) Int. Cl.
*A43C 7/00* (2006.01)
*A43C 7/08* (2006.01)
*A45F 5/02* (2006.01)
*G01P 15/18* (2013.01)
*G03B 29/00* (2021.01)

(52) U.S. Cl.
CPC .............. *A45F 5/02* (2013.01); *G01P 15/18* (2013.01); *G03B 29/00* (2013.01); *A45F 2005/023* (2013.01)

(56) References Cited

U.S. PATENT DOCUMENTS

| | | | |
|---|---|---|---|
| 5,029,371 A | 7/1991 | Rosenblood | |
| 5,345,657 A * | 9/1994 | Shimizu | F16G 11/101 24/136 L |
| 5,649,340 A * | 7/1997 | Ida | F16G 11/101 24/136 R |
| 5,899,963 A * | 5/1999 | Hutchings | A61B 5/1123 702/145 |
| 6,876,947 B1 * | 4/2005 | Darley | G01P 1/023 702/144 |
| 7,255,468 B2 * | 8/2007 | Capriola | A43B 1/0027 36/137 |
| 7,404,263 B2 | 7/2008 | Guzman | |
| 7,596,891 B2 * | 10/2009 | Carnes | A43B 3/0031 36/25 R |
| 7,695,154 B2 * | 4/2010 | Ellenburg | A43B 1/0036 362/205 |
| 7,722,219 B2 * | 5/2010 | Hartley | A43B 3/34 362/253 |
| 7,908,774 B2 * | 3/2011 | Mirza | A43B 3/24 36/137 |
| 7,927,253 B2 * | 4/2011 | Vincent | A63B 24/0087 482/8 |
| 8,172,722 B2 * | 5/2012 | Molyneux | A43B 1/0054 482/901 |
| 8,181,320 B2 * | 5/2012 | Wolfberg | A43C 7/00 36/50.1 |
| 8,231,506 B2 * | 7/2012 | Molyneux | A43B 5/02 482/901 |
| 8,360,904 B2 * | 1/2013 | Oleson | A43B 13/00 482/8 |
| D689,495 S | 9/2013 | Bentley et al. | |
| D694,842 S | 12/2013 | Bentley et al. | |
| 8,613,676 B2 | 12/2013 | Bentley | |
| 8,628,453 B2 * | 1/2014 | Balakrishnan | H04N 23/66 482/901 |
| 8,700,354 B1 | 4/2014 | Bentley et al. | |
| 8,702,430 B2 * | 4/2014 | Dibenedetto | H04M 1/72412 434/258 |
| 8,702,516 B2 * | 4/2014 | Bentley | G06T 7/20 463/40 |
| D706,654 S | 6/2014 | Bentley et al. | |
| 8,739,639 B2 * | 6/2014 | Owings | A61B 5/1036 73/862.391 |
| 8,769,836 B2 * | 7/2014 | Donovan | A43B 3/38 33/3 A |
| 8,827,824 B2 | 9/2014 | Bentley et al. | |
| 8,903,521 B2 | 12/2014 | Goree et al. | |
| 8,904,605 B2 * | 12/2014 | Kawaguchi | F16G 11/03 D8/383 |
| 8,905,855 B2 | 12/2014 | Fitzpatrick et al. | |
| 8,913,134 B2 | 12/2014 | Goree et al. | |
| 8,941,723 B2 * | 1/2015 | Bentley | A61B 5/6895 348/47 |
| 8,944,928 B2 | 2/2015 | Kaps et al. | |
| 8,994,826 B2 * | 3/2015 | Bentley | G01S 19/19 473/223 |
| 9,017,296 B2 * | 4/2015 | Beck | A61M 39/28 604/249 |
| 9,028,337 B2 | 5/2015 | Bentley | |
| 9,039,527 B2 | 5/2015 | Bentley et al. | |
| 9,301,569 B2 * | 4/2016 | Donovan | A43B 3/36 |
| 9,542,706 B2 * | 1/2017 | Case, Jr. | G08B 1/08 |
| 9,642,415 B2 | 5/2017 | Pease | |
| 9,743,861 B2 * | 8/2017 | Giedwoyn | G16H 20/30 |
| 9,763,489 B2 * | 9/2017 | Amos | A63F 13/214 |
| 9,928,878 B2 | 3/2018 | Anderson | |
| 10,238,166 B2 | 3/2019 | Rosenbaum | |
| 10,363,453 B2 * | 7/2019 | Fitzgerald | A43B 3/34 |
| 10,409,961 B2 | 9/2019 | Flaherty | |
| 10,512,304 B2 * | 12/2019 | Nussbaum | A43C 7/08 |
| 10,595,581 B2 * | 3/2020 | Nussbaum | A45F 5/02 |
| 10,667,580 B2 | 6/2020 | Kovach et al. | |
| 10,926,133 B2 * | 2/2021 | Giedwoyn | A63B 24/0021 |
| 10,983,945 B2 * | 4/2021 | Molettiere | G16H 10/60 |
| 11,060,926 B2 * | 7/2021 | Reif | G16H 50/20 |
| 11,510,462 B2 * | 11/2022 | Yun | A43C 11/20 |
| 11,603,905 B2 * | 3/2023 | Perrier | F16G 11/101 |
| 11,662,359 B2 * | 5/2023 | Kolen | A61B 5/11 73/379.01 |
| 11,684,111 B2 * | 6/2023 | Henrichot | A43B 3/34 700/275 |
| 11,937,666 B2 * | 3/2024 | Nussbaum | A45F 5/02 |
| 2002/0152645 A1 | 10/2002 | Darley et al. | |
| 2004/0221433 A1 * | 11/2004 | Wolfberg | A43B 3/34 24/712.5 |
| 2005/0268436 A1 * | 12/2005 | Yoshiguchi | F16G 11/101 24/115 G |
| 2007/0166024 A1 | 7/2007 | Robinson | |
| 2007/0260421 A1 * | 11/2007 | Berner, Jr. | A43B 13/00 702/155 |
| 2008/0115334 A1 * | 5/2008 | Chen | A43C 7/00 24/115 G |
| 2009/0223085 A1 | 9/2009 | Wolfberg | |
| 2009/0293313 A1 | 12/2009 | Bruce et al. | |
| 2011/0016680 A1 * | 1/2011 | Chang | A43C 7/00 24/712.5 |
| 2011/0178720 A1 | 7/2011 | Bamburg et al. | |
| 2011/0251822 A1 | 10/2011 | Darley et al. | |
| 2012/0088544 A1 | 4/2012 | Bentley et al. | |
| 2012/0215474 A1 | 8/2012 | Bentley et al. | |
| 2013/0008058 A1 * | 1/2013 | Jasmine | A43B 3/34 36/136 |
| 2013/0095941 A1 | 4/2013 | Bentley et al. | |
| 2013/0117975 A1 | 5/2013 | Herrera | |
| 2013/0128022 A1 | 5/2013 | Bose et al. | |
| 2013/0185003 A1 * | 7/2013 | Carbeck | G01L 1/00 702/41 |
| 2013/0211774 A1 | 8/2013 | Bentley et al. | |

(56) References Cited

U.S. PATENT DOCUMENTS

| | | | |
|---|---|---|---|
| 2014/0085465 A1* | 3/2014 | Angermann | G01C 21/005 348/143 |
| 2014/0376876 A1 | 12/2014 | Bentley et al. | |
| 2015/0059136 A1* | 3/2015 | Schreiner | A43C 7/00 24/712.3 |
| 2015/0154452 A1 | 6/2015 | Bentley et al. | |
| 2017/0241797 A1 | 8/2017 | Kong et al. | |
| 2020/0008745 A1* | 1/2020 | Burch, V | A61B 5/0004 |
| 2020/0375470 A1* | 12/2020 | Fu | A43B 7/147 |
| 2021/0012877 A1 | 1/2021 | Aragones et al. | |
| 2021/0014582 A1 | 1/2021 | Case, Jr. | |
| 2021/0315315 A1 | 10/2021 | Nussbaum | |

FOREIGN PATENT DOCUMENTS

| | | |
|---|---|---|
| JP | 2009050699 A | 3/2009 |
| JP | 2014504943 A | 2/2014 |
| KR | 20010065023 A | 7/2001 |
| WO | WO2013010171 A1 | 1/2013 |
| WO | WO2013184672 A2 | 12/2013 |
| WO | WO2014036374 A1 | 3/2014 |
| WO | WO2015191157 | 12/2015 |
| WO | WO2015191157 A1 | 12/2015 |

OTHER PUBLICATIONS

Decision on Application issued on Oct. 17, 2023, by the China National Intellectual Property Administration, in CNIPA Application Serial No. 2021111964284. Informal English translation with redactions provided.

The International Search Report and Written Opinion of the International Searching Authority, dated Jul. 20, 2015, FlyClip LLC, PCT/US15/25763. (related application).

The International Preliminary Report on Patentability, dated Oct. 18, 2016, FlyClip LLC, PCT/US15/25763. (related application).

"Beyond Fitbit: Sensors track hang time, vertical leaps", San Diego Union Tribune Newspaper Article by Mike Freeman dated Jun. 17, 2015, pp. 1-3.

Supplementary European Search Report from the European Patent Office, U.S. Appl. No. 15/301,946, dated Oct. 16, 2017.

Office Action issued on Feb. 17, 2018 by the State Intellectual Property Office of China in Application No. 2015800318712 (this Chinese application is related to the instant U.S. Application and both claim priority from PCT application PCT/US2015/025763).

Office Action issued on Oct. 17, 2018 by the State Intellectual Property Office of China in Application No. 2015800318712 (this Chinese application is related to the instant U.S. Application and both claim priority from PCT application PCT/US2015/025763).

Office Action issued on Oct. 15, 2018 by the European Patent Office in Application No. 15806231.5 (this EPO application is related to the instant U.S. Application and both claim priority from PCT application PCT/US2015/025763).

Response to Office Action filed on Feb. 14, 2019 with the European Patent Office in Application No. 15806231.5 (this EPO application is related to the instant U.S. Application and both claim priority from PCT application PCT/US2015/025763).

Office Action issued on Mar. 4, 2019 by the Australian Intellectual Property Office in Application No. 2015272024 (this Australian application is related to the instant U.S. Application and both claim priority from PCT application PCT/US2015/025763).

Office Action issued on Mar. 26, 2019 by the Japan Patent Office in Application No. 2016-562003 (this Japanese application is related to the instant U.S. Application and both claim priority from PCT application PCT/US2015/025763).

Office Action issued on Oct. 29, 2019 by the Japan Patent Office in Application No. 2016-562003 (this Japanese application is related to the instant U.S. Application).

Office Action issued by the U.S. Patent Office in U.S. Appl. No. 17/354,655 dated Feb. 21, 2023.

First Office Action issued by the Canadian Intellectual Property Office on Apr. 1, 2020, in Canadian Patent Application No. 2,945,792. (This application is related to U.S. Appl. No. 16/690,908).

Office Action from the State Intellectual Property Office—China, in Application No. 2015800318712, dated Apr. 1, 2021. (This application is related to U.S. Appl. No. 16/690,908).

International Search Report and Written Opinion, issued by European Patent Office, in Application No. PCT/2021/038485, dated Oct. 12, 2021. (Related matter).

Office Action issued by the China Intellectual Property Administration, on Nov. 30, 2022, in Chinese Patent Application No. 2021111964284. (Related matter).

Notification Concerning Transmittal of International Preliminary Report on Patentability issued by the International Bureau on Jan. 5, 2023, in PCT patent application serial No. PCT/US2021/038485. (Related matter).

* cited by examiner

14

14

LACE ADJUSTER ASSEMBLY INCLUDING FEEDBACK ASSEMBLY FOR USE IN VISUALIZING AND MEASURING ATHLETIC PERFORMANCE

RELATED APPLICATIONS

The present application claims priority on U.S. Provisional Application Ser. No. 63/446,546, filed on Feb. 17, 2023, and entitled "LACE ADJUSTER ASSEMBLY INCLUDING FEEDBACK ASSEMBLY FOR USE IN VISUALIZING AND MEASURING ATHLETIC PERFORMANCE". As far as permitted, the contents of U.S. Provisional Application Ser. No. 63/446,546 are incorporated in their entirety herein by reference.

Additionally, the present application is a continuation-in-part application of U.S. application Ser. No. 18/110,817 filed on Feb. 16, 2023, and entitled "LACE ADJUSTER ASSEMBLY INCLUDING FEEDBACK ASSEMBLY FOR USE IN VISUALIZING AND MEASURING ATHLETIC PERFORMANCE". U.S. application Ser. No. 18/110,817 is a continuation application of U.S. application Ser. No. 16/690,908 filed on Nov. 21, 2019, and entitled "LACE ADJUSTER ASSEMBLY INCLUDING FEEDBACK ASSEMBLY FOR USE IN VISUALIZING AND MEASURING ATHLETIC PERFORMANCE"; which is a continuation application of U.S. application Ser. No. 15/301,946 filed on Oct. 4, 2016 (now U.S. Pat. No. 10,595,581 B2 issued on Mar. 24, 2020), and entitled "LACE ADJUSTER ASSEMBLY INCLUDING FEEDBACK ASSEMBLY FOR USE IN VISUALIZING AND MEASURING ATHLETIC PERFORMANCE. As far as permitted, the contents of U.S. application Ser. Nos. 18/110,817, 16/690,908, and 15/301,946 (now U.S. Pat. No. 10,595,581 B2) are incorporated in their entirety herein by reference.

U.S. application Ser. No. 15/301,946 is a 371 of PCT/US2015/025763 filed on Apr. 14, 2015, and entitled "LACE ADJUSTER ASSEMBLY INCLUDING FEEDBACK ASSEMBLY FOR USE IN VISUALIZING AND MEASURING ATHLETIC PERFORMANCE". PCT Application Serial No: PCT/US2015/025763 is related to and claims priority on (i) U.S. Provisional Application Ser. No. 61/979,491 filed on Apr. 14, 2014, and entitled "LACE ADJUSTER"; (ii) U.S. Provisional Application Ser. No. 62/018,194 filed on Jun. 27, 2014, and entitled "SENSOR ASSEMBLY FOR USE IN MEASURING ATHLETIC PERFORMANCE"; and (iii) U.S. Provisional Application Ser. No. 62/043,822 filed on Aug. 29, 2014, and entitled "IMAGE ASSEMBLY AND SENSOR ASSEMBLY FOR USE IN VISUALIZING AND MEASURING ATHLETIC PERFORMANCE". To the extent permissible, the contents of (i) PCT Application Serial No: PCT/US2015/025763, and (ii) U.S. Provisional Application Ser. Nos. 61/979,491, 62/018,194, and 62/043,822 are incorporated in their entirety herein by reference.

Further, the present application is also a continuation-in-part application of U.S. application Ser. No. 17/354,655 filed on Jun. 22, 2021, and entitled "LACE ADJUSTER ASSEMBLY INCLUDING FEEDBACK ASSEMBLY FOR USE IN VISUALIZING AND MEASURING ATHLETIC PERFORMANCE". U.S. application Ser. No. 17/354,655 is related to and claims priority on U.S. Provisional Application Ser. No. 63/042,401 filed on Jun. 22, 2020, and entitled "LACE ADJUSTER". To the extent permissible, the contents of U.S. application Ser. No. 17/354,655, and U.S. Provisional Application Ser. No. 63/042,401 are incorporated in their entirety herein by reference.

BACKGROUND

Many athletes, professional or amateur, serious, or casual, are very interested in visualizing, quantifying and/or improving their athletic performances. Thus, it is desired to provide a device that enables such athletes to effectively visualize and/or gauge various aspects of their athletic performance through generation of performance metrics and statistical data, which can then be subsequently used as a means to view unique perspectives of their athletic performance and/or to improve their athletic performance over time.

Additionally, it is often necessary to adjust, tighten, and untighten (or loosen) the shoelaces of a shoe. It is further desired to inhibit the shoelaces from being a potential tripping hazard for the person wearing the shoes. This can be especially true for an athlete during an athletic performance, as problems with shoelaces being untied, too tight, or too loose, and/or becoming tripping hazards, can lead to sub-optimal performance and/or injury.

SUMMARY

The present invention is directed toward a lace adjuster system that is adapted to selectively adjust a first shoelace of a first shoe of a user and to selectively adjust a second shoelace of a second shoe of the user. In various embodiments, the lace adjuster system includes a first lace adjuster assembly and a second lace adjuster assembly. The first lace adjuster assembly includes (i) a first lace adjuster that is adapted to selectively adjust the first shoelace of the first shoe of the user; and (ii) a first feedback assembly that is mechanically coupled to the first lace adjuster, the first feedback assembly being configured to selectively measure statistical data of the user during an athletic performance, the first feedback assembly including a first sensor assembly including a first performance sensor that is mechanically coupled to the first lace adjuster and that senses a first performance characteristic of the user during the athletic performance; and a first controller that is electrically coupled to the first performance sensor, the first controller including a first processor, the first controller receiving the first performance characteristic from the first performance sensor and generating a first statistical data point that is based at least in part on the first performance characteristic. The second lace adjuster assembly includes (i) a second lace adjuster that is adapted to selectively adjust the second shoelace of the second shoe of the user; and (ii) a second feedback assembly that is mechanically coupled to the second lace adjuster, the second feedback assembly being configured to selectively measure statistical data of the user during the athletic performance, the second feedback assembly including a second sensor assembly including a second performance sensor that is mechanically coupled to the second lace adjuster and that senses a second performance characteristic of the user during the athletic performance; and a second controller that is electrically coupled to the second performance sensor, the second controller including a second processor, the second controller receiving the second performance characteristic from the second performance sensor and generating a second statistical data point that is based at least in part on the second performance characteristic.

In some embodiments, the first controller is the same as the second controller.

In certain embodiments, the first controller and the second controller are each within a remote device.

In many embodiments, the first statistical data point and the second statistical data point are combined by one of the first controller and the second controller to generate a combined statistical data point having enhanced accuracy relative to the first statistical data point and the second statistical data point.

In certain embodiments, the first feedback assembly further includes a first storage device for storing the combined statistical data point.

In some embodiments, the first storage device is mechanically coupled to the lace adjuster; and the first sensor assembly further includes a first transmitter for transmitting the combined statistical data point from the first storage device to a remote device.

In certain embodiments, the first transmitter transmits the combined statistical data point from the first storage device to the remote device via a wireless connection. In other embodiments, the first transmitter transmits the combined statistical data point from the first storage device to the remote device via a wired connection.

In various embodiments, the first storage device is positioned within a remote device.

In many embodiments, the first performance sensor senses one or more of a horizontal movement, a vertical movement and an angular movement of the user during the athletic performance.

In some embodiments, the first performance sensor is one of a two-axis accelerometer, a three-axis accelerometer, and a three-axis gyrometer.

In certain embodiments, the first performance sensor includes a first magnetometer that measures a magnitude and direction of magnetic fields at a point in space in relation to a position of the user during the athletic performance.

In some embodiments, the second performance sensor senses the one or more of a horizontal movement, a vertical movement and an angular movement of the user during the athletic performance.

In certain embodiments, the second performance sensor is the one of a two-axis accelerometer, a three-axis accelerometer, and a three-axis gyrometer.

In some embodiments, the second performance sensor includes a second magnetometer that measures a magnitude and direction of magnetic fields at a point in space in relation to a position of the user during the athletic performance.

In many embodiments, the first feedback assembly further includes a first image capturing assembly that captures a first image of the user during the athletic performance.

In various embodiments, the second feedback assembly further includes a second image capturing assembly that captures a second image of the user during the athletic performance.

In certain embodiments, the first image capturing assembly includes a first optical assembly and a first capturing system, and the first optical assembly focuses light onto the first capturing system so that the first capturing system can capture the first image of the user.

In some embodiments, the first image of the user is one of a still image and a video image.

In certain embodiments, the first sensor assembly further includes a first locational sensor for providing precise locational information of the user; and the locational information from the first locational sensor is wirelessly transmitted to a remote device.

In some embodiments, the second sensor assembly further includes a second locational sensor for providing precise locational information of the user; and the locational information from the second locational sensor is wirelessly transmitted to the remote device.

In many embodiments, the first lace adjuster includes (i) a body assembly having a first body member and a second body member that is coupled to the first body member, the body assembly defining a cavity, and (ii) a lace end retainer that is connected to the body assembly, the lace end retainer being configured to selectively retain at least a portion of the shoelace, the lace adjuster being selectively movable between an unlocked configuration and a locked configuration, wherein the shoelace is adjustable relative to the lace adjuster when the lace adjuster is in the unlocked configuration, and wherein the shoelace is resiliently retained by the lace adjuster and is inhibited from being adjusted relative to the lace adjuster when the lace adjuster is in the locked configuration; and wherein the first performance sensor is positioned within the cavity.

The present invention is further directed toward a lace adjuster system that is adapted to selectively adjust a first shoelace of a first shoe of a user and to selectively adjust a second shoelace of a second shoe of the user, including a first lace adjuster assembly including (i) a first lace adjuster that is adapted to selectively adjust the first shoelace of the first shoe of the user; and (ii) a first feedback assembly that is mechanically coupled to the first lace adjuster, the first feedback assembly being configured to selectively measure statistical data of the user during an athletic performance, the first feedback assembly including a first sensor assembly including a first performance sensor that is mechanically coupled to the first lace adjuster and that senses a first performance characteristic of the user during the athletic performance; and a first controller that is electrically coupled to the first performance sensor, the first controller including a first processor, the first controller receiving the first performance characteristic from the first performance sensor and generating a first statistical data point that is based at least in part on the first performance characteristic; and a second lace adjuster assembly including (i) a second lace adjuster that is adapted to selectively adjust the second shoelace of the second shoe of the user; and (ii) a second feedback assembly that is mechanically coupled to the second lace adjuster, the second feedback assembly being configured to selectively measure statistical data of the user during the athletic performance, the second feedback assembly including a second sensor assembly including a second performance sensor that is mechanically coupled to the second lace adjuster and that senses a second performance characteristic of the user during the athletic performance; and a second controller that is electrically coupled to the second performance sensor, the second controller including a second processor, the second controller receiving the second performance characteristic from the second performance sensor and generating a second statistical data point that is based at least in part on the second performance characteristic; wherein the first statistical data point and the second statistical data point are combined by one of the first controller and the second controller to generate a combined statistical data point having enhanced accuracy relative to the first statistical data point and the second statistical data point; wherein the first feedback assembly further includes a first storage device for storing the combined statistical data point; wherein the first storage device is mechanically coupled to the first lace adjuster, the first sensor assembly further including a first transmitter for transmitting the combined statistical data point from the first storage device to a remote device; wherein the first performance sensor senses one or more of a horizontal movement, a vertical movement and an angular movement of the user during the athletic performance; wherein the second performance sensor senses the one or more of a horizontal movement, a vertical movement and an angular movement of the user during the athletic performance; wherein the first feedback assembly includes a first image capturing assembly that captures a first image of the user during the athletic performance; wherein the second feedback assembly includes a second image capturing assembly that captures a second image of the user during the athletic performance; wherein the first sensor assembly further includes a first locational sensor for providing precise locational information of the user, the locational information from the first locational sensor being wirelessly transmitted to a remote device; and wherein the second sensor assembly further includes a second locational sensor for providing precise locational information of the user, the locational information from the second locational sensor being wirelessly transmitted to the remote device.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

While embodiments of the present invention are susceptible to various modifications and alternative forms, specifics thereof have been shown by way of example and drawings, and are described in detail herein. It is understood, however, that the scope herein is not limited to the particular embodiments described. On the contrary, the intention is to cover modifications, equivalents, and alternatives falling within the spirit and scope herein.

DESCRIPTION

Figure 1:
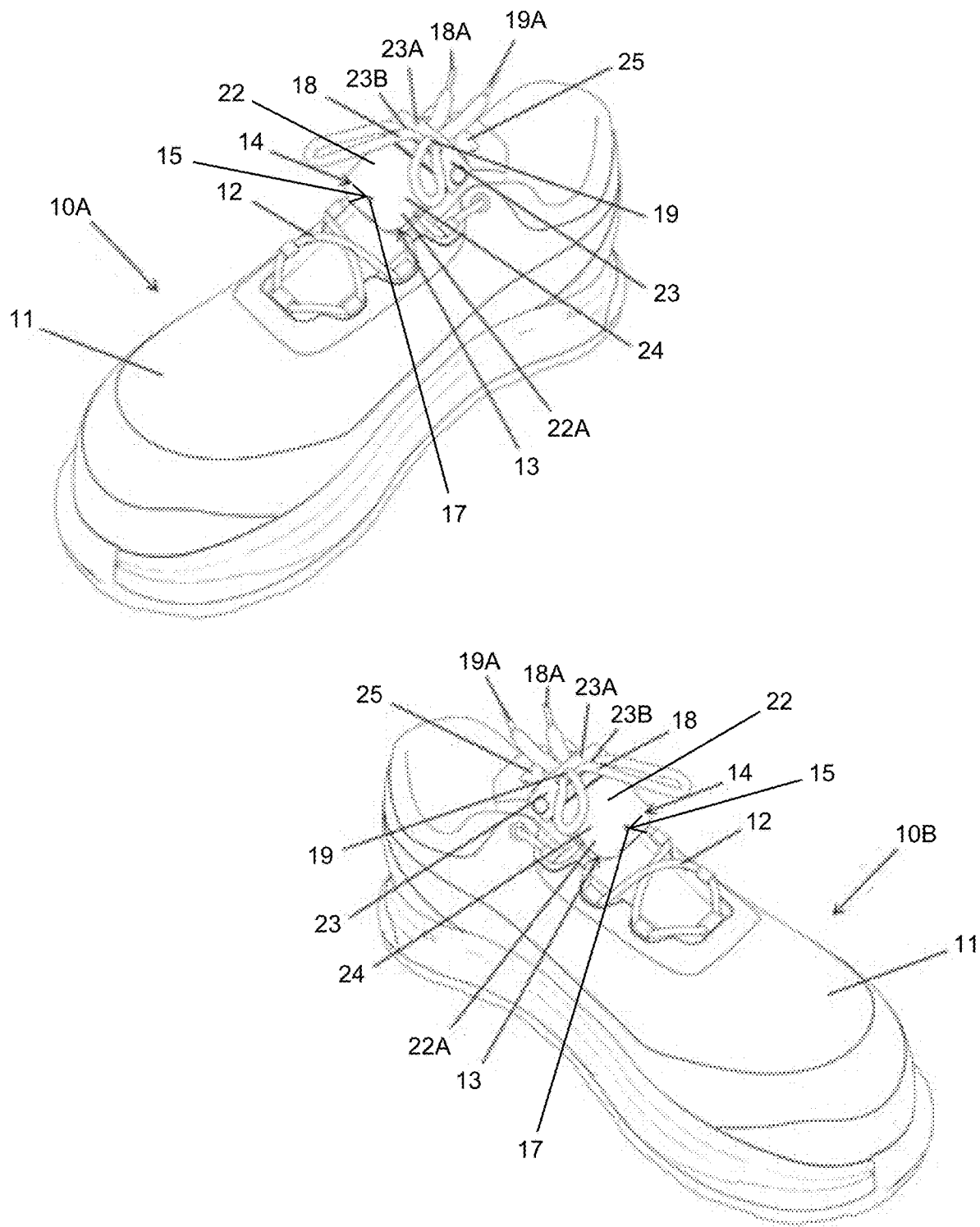
FIG. 1 is a perspective view of an embodiment of a pair of shoes, each shoe including a shoe body and a shoelace, and an embodiment of a lace adjuster assembly having features of the present invention that can be selectively coupled to the shoelace of each of the shoes, the lace adjuster assembly including a lace adjuster, and a feedback assembly, including a sensor assembly and an image capturing assembly, that is mechanically coupled to the lace adjuster.

FIG. 1 is a perspective view of an embodiment of a pair of shoes, i.e. a first shoe 10A and a second shoe 10B, with each shoe 10A, 10B including a shoe body 11 and a shoelace 12 that is coupled to the shoe body 11, and an embodiment of a lace adjuster assembly 13 having features of the present invention that can be selectively coupled to the shoelace 12 of each of the shoes 10A, 10B. In various embodiments, the lace adjuster assembly 13 includes a lace adjuster 14, and a feedback assembly 15, including one or more of a sensor assembly 216 (illustrated more clearly, for example, in FIG. 2F) and an image capturing assembly 17 (also referred to herein simply as an "image assembly"), that is mechanically coupled to the lace adjuster 14. Alternatively, in certain non-exclusive alternative embodiments, the lace adjuster assembly 13 and/or the feedback assembly 15 can be designed without the sensor assembly 216 and/or without the image assembly 17.

The shoes 10A, 10B, including the shoe body 11 and the shoelace 12, can have any suitable design, shape and/or size to meet the specific desires and requirements of the user. As illustrated in FIG. 1, the shoes 10A, 10B can be athletic-type shoes that can be used by a user for running, walking, engaging in any of various athletic performances, or for any other chosen activity. Alternatively, the shoes 10A, 10B can be another type of shoe. As shown in FIG. 1, the shoelace 12 includes a first lace end 18 having a first end tip 18A, and an opposed second lace end 19 having a second end tip 19A.

As an overview, the feedback assembly 15 is uniquely configured to provide statistical data (via the sensor assembly 216) and images (via the image assembly 17) to an athlete (also sometimes referred to herein generally as a "user") who is using the lace adjuster assembly 13 and/or the feedback assembly 15. In certain implementations, the user can utilize separate lace adjuster assemblies 13, and thus separate feedback assemblies 15, on each of their shoes 10A, 10B. More specifically, in such implementations, the user can have and utilize (i) a first lace adjuster assembly 13 that is coupled to a first shoelace 12 of the first shoe 10A, the first lace adjuster assembly 13 including a first lace adjuster 14 and a first feedback assembly 15 that is mechanically coupled to the first lace adjuster 14; and (ii) a second lace adjuster assembly 13 that is coupled to a second shoelace 12 of the second shoe 10B, the second lace adjuster assembly including a second lace adjuster 14 and a second feedback assembly 15 that is mechanically coupled to the second lace adjuster 14. In such implementations, the first lace adjuster assembly 13 and the second lace adjuster assembly 13 can be collectively referred to as a "lace adjuster system"; and the first feedback assembly 15 and the second feedback assembly 15 can be referred to collectively as a "feedback system".

It is appreciated that in such embodiments that include two separate lace adjuster assemblies 13 and two separate feedback assemblies 15, the first shoe 10A and the second shoe 10B can be substantially identical with the exception of one shoe being a right shoe and the other shoe being a corresponding left shoe.

It is further appreciated that the separate lace adjuster assemblies 13 and/or the separate feedback assemblies 15 will typically be identical to one another, but just simply attached to different shoes 10A, 10B, such as the first (right) shoe 10A and the second (left) shoe 10B. Alternatively, the lace adjuster assemblies 13 and/or the feedback assemblies 15 for each shoe 10A, 10B can be different from one another in any desired manner.

As described herein, it is appreciated that the sensor assembly 216 is able to provide different, enhanced and more accurate statistical data to the user when the user has a separate lace adjuster assembly 13, and thus a separate sensor assembly 216, coupled to the shoelaces 12 of each of their two shoes 10A, 10B. The image assembly 17 is also able to provide additional and potentially more unique images for the user when the user has a separate lace adjuster assembly 13 coupled to the shoelaces 12 of each of their two shoes 10A, 10B.

In various embodiments, the sensor assembly 216 can be uniquely designed to provide the athlete who is using the sensor assembly 216, such as in conjunction with the lace adjuster 14, with sensed performance characteristics from which can be derived statistical data that enables the athlete to effectively gauge various aspects of their athletic performance and/or evaluate biomechanical movements for injury prevention. In different embodiments, the sensor assembly 216 can include one or more performance sensors 216P (illustrated in FIG. 2F) in order to provide sensed performance characteristics that are usable to derive statistical data that relates to substantially horizontal movements of the athlete, substantially vertical movements of the athlete, angular and/or rotational movements of the athlete, and/or energy, intensity and force expenditures by the athlete during the performance of an athletic activity. For example, in certain embodiments, the sensor assembly 216 and/or the performance sensors 216P can provide the athlete with sensed performance characteristics that are usable to derive statistical data related to number of steps taken, total distance traveled, distance traveled per step (such as stride length), stride duration, ground contact (foot strike) duration and pattern, foot acceleration and foot angle during strides (gait tracking, including foot strike angle), speed of travel, horizontal burst (such as sudden acceleration from an average rate of speed), number of jumps, height of jumps, jump duration, vertical burst (such as take-off velocity or acceleration for a jump), number of accelerations (relating to horizontal burst and/or vertical burst), angular, twisting or rotational movements of the athlete (and/or the speed of such movements), energy expended during athletic performance (such as in kcal), and/or force expended during athletic performance (such as in psi, kpi, or other force measurements). In some embodiments, the sensor assembly 216 and/or the performance sensors 216P can also provide the athlete with sensed performance characteristics that are usable to derive average, minimum and maximum values for any of the noted statistical data points that are generated during the performance of an athletic activity. In many embodiments, the sensor assembly 216 and/or the performance sensors 216P can further provide the athlete with sensed performance characteristics that are usable to derive other desired statistical data. It is appreciated that the terms "athletic performance" and "athletic activity" are used interchangeably herein.

In certain implementations, such as when the user has separate feedback assemblies 15 attached to each shoe 10A, 10B, the feedback assemblies 15 are better able to accomplish "true" gait tracking (vs. extrapolating using only one foot). Thus, the use of separate feedback assemblies 15 for each foot enables much improved accuracy related to the various statistical data points noted above. Using separate feedback assemblies 15 on each shoe 10A, 10B also enables improved tracking of any gait imbalance a lot more accurately, which is linked to evaluation of proper biomechanics. For example, an injury and/or fatigue may cause an athlete to use one foot differently, leading to more joint/muscle stress. Using separate feedback assemblies 15 on each shoe 10A, 10B enables enhanced tracking of any such imbalances with much greater accuracy.

In various implementations, the statistical data that is provided through use of the sensor assembly 216 can be subsequently utilized by the athlete to evaluate various performance metrics. The performance metrics that are assessed throughout an athletic performance can then be used by the athlete to tailor their training programs and schedules with the goal of ultimately improving their athletic performance through concepts such as improved biomechanics, injury prevention, etc.

In certain embodiments or applications, the sensor assembly 216 can further include Bluetooth and/or GPS capabilities. For example, in some such embodiments, the sensor assembly 216 can further include one or more locational sensors 216L (illustrated in FIG. 2F), such as GPS sensors, for providing accurate and precise locational information that can be used by the individual wearing the lace adjuster 14.

In some applications, the locational sensors 216L can be utilized for purposes of navigation so that the individual wearing the lace adjuster 14 always knows where he or she is, as well as where he or she needs to go to reach any desired destination. In such uses, the locational sensors 216L can be utilized to inhibit the person wearing the lace adjuster 14 from getting lost and/or to enable the wearer to follow a prescribed trail, such as during an adventure race and/or when exploring the wilderness.

In other applications, the locational sensors 216L can offer a sense of security for someone, such as a parent or guardian, who is charged with care for and/or monitoring of the individual wearing the lace adjuster 14. In such applications, the locational information from the locational sensors 216L can be wirelessly transmitted to a remote receiver so that the parent or guardian can always have the accurate and precise locational information of the person wearing the lace adjuster 14. With such applications, the parent or guardian can help assist the wearer from getting lost and/or inhibit the wearer from going to undesired or inappropriate locations.

In various embodiments, it is appreciated that any information from the sensor assembly 216, including information from any of the performance sensors 216P and/or the locational sensors 216L, can be downloaded into a remote device 220 (illustrated in FIG. 2F) via a connector port 221 (illustrated in FIG. 2I), such as a USB port, or other suitable connection. As illustrated, the connector port 221 can be formed into and/or coupled to an adjuster body 22 of the lace adjuster 14. The connector port 221 is also electrically coupled to the sensor assembly 216 and/or the image assembly 17 of the feedback assembly 15. With such capabilities to download the desired performance characteristics from the sensor assembly 216 to the remote device 220, the user can view any associated data that was generated during the athletic activity from any of the performance sensors 216P and/or the locational sensors 216L of the sensor assembly 216. For example, the user can download information into the remote device 220 that was generated using the locational sensors 216L, so the user can precisely see the specific path or trail that was followed, such as on foot, by bicycle, etc.

The image assembly 17 can be uniquely designed and/or positioned to provide the athlete who is using the image assembly 17, such as in conjunction with the lace adjuster 14, with unique viewpoints from which the athlete is able to visualize and/or evaluate various aspects of their athletic performance. For example, in different embodiments, depending upon the specific positioning and orientation of the image assembly 17 during use, the athlete is able to effectively capture, review and analyze images (such as still images and/or video images) of themselves demonstrating unique perspectives and angles of their athletic performance. With such design, the athlete may be able to gather unique insights into their athletic performance, which would not otherwise be available from remote positioning of an image assembly.

For example, the image assembly 17 can provide low-resolution or high-resolution images or video (and sound). The images or video can be transmitted via Wi-Fi, Bluetooth, or a USB port in certain non-exclusive embodiments. In some embodiments, the images or video can be transmitted for a TV broadcast during a performance or game. The image assembly 17 can be controlled by a button on the lace adjuster 14 or it can be remotely controlled. In the embodiment illustrated in FIG. 1, the image assembly 17 is secured to, mechanically coupled to and/or integrated into the lace adjuster 14. The image, video and sound can be of the person wearing the image assembly 17 and his surrounding environment.

In certain embodiments, the image assembly 17 can be directed in a generally upward or outward direction from the shoe 10A, 10B to capture the desired images or video. In some embodiments, the direction of where the image assembly 17 is directed can be controlled and/or adjusted by the user, and/or can be controlled remotely by another individual. Alternatively, the image assembly 17 can be directed in a different direction.

Moreover, as with the sensor assembly 216, it should be appreciated that any information from the image assembly 17 can also be downloaded into the remote device 220 via the connector port 221 or other suitable connection. With such design, the user can view any images from the athletic activity at his or her convenience after completion of the athletic activity.

In certain implementations, any data and information gathered via the feedback assemblies 15, i.e. from the sensor assemblies 216 and/or the image assemblies 17 can be connected to a module for use in a team-based aspect. More particularly, such data and information gathered via the feedback assemblies 15 can be compiled together for multiple users or athletes as part of a team evaluation or analysis within such module. In such implementations, the users can see live team-based data, which may be usable for any high performance workouts and team sports.

In other implementations, any data and information gathered via the feedback assemblies 15, i.e. from the sensor assemblies 216 and/or the image assemblies 17 can be integrated within a video game. For example, the movements of the user during an athletic performance can be utilized and/or demonstrated through corresponding movements of a video game character during the playing of the video game.

In various embodiments, the lace adjuster 14 can have any suitable design for purposes of enabling the user to quickly and easily adjust, tighten or loosen the shoelace 12 of the shoe 10A, 10B. For example, in certain non-exclusive alternative embodiments, the lace adjuster 14 can be designed to include various features and limitations such as described in U.S. Pat. No. 8,181,320 B2 issued on May 22, 2012, and entitled "LACE ADJUSTER", U.S. Pat. No. 10,512,304 B2 issued on Dec. 24, 2019, and entitled "LACE ADJUSTER WITH INTERCHANGEABLE COVERS", and/or U.S. Pat. No. 10,595,581 B2 issued on Mar. 24, 2020, and entitled "LACE ADJUSTER ASSEMBLY INCLUDING FEEDBACK ASSEMBLY FOR USE IN VISUALIZING AND MEASURING ATHLETIC PERFORMANCE". As far as permitted, the contents of U.S. Pat. Nos. 8,181,320 B2, 10,512,304 B2, and 10,595,581 B2 are incorporated in their entireties herein by reference. Alternatively, the lace adjuster 14 can have another suitable design.

As shown in the embodiment illustrated in FIG. 1, the lace adjuster 14 can include the adjuster body 22 that is configured to be selectively coupled to the shoelace 12 of the shoe 10A, 10B, and a lace end retainer 23 that is coupled to the adjuster body 22. In certain embodiments, the adjuster body 22 can include a first body member 24 and a second body member 25 that are movable relative to one another between an unlocked configuration wherein the lace adjuster 14 can effectively receive the first lace end 18 and/or the second lace end 19 of the shoelace 12, and a locked configuration wherein the lace adjuster 14 retains the first lace end 18 and/or the second lace end 19 so that the lace adjuster 14 is fixed in position and/or is inhibited from moving relative to the shoelace 12. Alternatively, the lace adjuster 14 can include more components or fewer components than those specifically illustrated in FIG. 1.

In many embodiments, the lace adjuster 14 is configured to be selectively coupled to the shoelace 12 when it is desired to quickly and easily adjust, tighten and/or loosen the shoelace 12 relative to the shoe body 11. In some embodiments, the lace end retainer 23 is configured to selectively receive and securely retain the first lace end 18, such as at or near the first end tip 18A, and/or the second lace end 19, such as at or near the second end tip 19A, to inhibit the shoelace 12 from being a potential tripping hazard for the user or wearer of the shoe 10A, 10B. In certain embodiments, the lace end retainer 23 is configured to receive and securely retain the first lace end 18 and/or the second lace end 19 between the lace end retainer 23 and the adjuster body 22. More particularly, in such embodiments, the lace end retainer 23 is configured such that the first lace end 18 and/or the second lace end 19 are inhibited from being moved relative to the lace end retainer 23 and the adjuster body 22 when retained by the lace end retainer 23 by a force generated by a contact pressure of the lace end retainer 23 against a surface 22A of the adjuster body 22. Stated in another manner, in such embodiments, the first lace end 18 and/or the second lace end 19 are inhibited from being moved relative to the lace end retainer 23 and the adjuster body 22 when retained by the lace end retainer 23 by effectively pinching the first lace end 18 and/or the second lace end 19 between the lace end retainer 23 and the surface 22A of the adjuster body 22.

As described herein, the lace end retainer 23 can be coupled to the adjuster body 22 in any suitable manner. For example, in one embodiment, the lace end retainer 23 is fixedly coupled to the adjuster body 22. Alternatively, in another embodiment, the lace end retainer 23 is removably coupled to the adjuster body 22.

In some embodiments, the lace end retainer 23 can be configured such that the lace end retainer 23 extends partially around the adjuster body 22 when the lace end retainer 23 is coupled to the adjuster body 22. Alternatively, the lace end retainer 23 can be configured such that the lace end retainer 23 extends fully around the adjuster body 22 when the lace end retainer 23 is coupled to the adjuster body 22.

The lace end retainer 23 can have any suitable design for purposes of effectively receiving and retaining the first lace end 18 and/or the second lace end 19 between the lace end retainer 23 and the adjuster body 22. In certain embodiments, such as shown in FIG. 1, the lace end retainer 23 can include a retainer body 23A and a retainer aperture 23B that extends through the retainer body 23A.

It is appreciated that the first lace end 18 and/or the second lace end 19 can be retained between the lace end retainer 23 and the adjuster body 22 in any suitable manner and can be oriented in any suitable direction. In some such embodiments, the first lace end 18 and/or the second lace end 19 can extend through the retainer aperture 23B as the lace adjuster 14 is being initially coupled to the shoelace 12. In one embodiment, the first lace end 18 and/or the second lace end 19 can again extend through the retainer aperture 23B before being retained between the lace end retainer 23 and the adjuster body 22. Alternatively, in another such embodiment, the first lace end 18 and/or the second lace end 19 can be positioned so as to extend fully under the retainer body 23A (and not back through the retainer aperture 23B) before being retained between the lace end retainer 23 and the adjuster body 22. Still alternatively, in still another such embodiment, the first lace end 18 and/or the second lace end 19 can extend and be retained between the lace end retainer 23 and the adjuster body 22 before the lace end 18, 19 extends in a generally outward direction through the retainer aperture 23B. It is appreciated that in any of such embodiments, the lace ends 18, 19 can extend between the lace end retainer 23 and the adjuster body 22 near or toward the top of the lace adjuster 14, near or toward the bottom of the lace adjuster 14, or near or toward both the top and the bottom of the lace adjuster 14.

Alternatively, in other such embodiments, the lace end retainer 23 can be positioned such that the first lace end 18 and/or the second lace end 19 do not extend through the retainer aperture 23B as the lace adjuster 14 is being initially coupled to the shoelace 12. In such alternative embodiments, the first lace end 18 and/or the second lace end 19 can extend through the retainer aperture 23B before being retained between the lace end retainer 23 and the adjuster body 22, the first lace end 18 and/or the second lace end 19 can be positioned so as to extend fully under the retainer body 23A (and not through the retainer aperture 23B) while being retained between the lace end retainer 23 and the adjuster body 22, or the first lace end 18 and/or the second lace end 19 can extend between the retainer body 23A and the adjuster body 22 before extending outwardly through the retainer aperture 23B.

Still alternatively, the lace end retainer 23 can be designed without the retainer aperture 23B, and the first lace end 18 and/or the second lace end 19 can be positioned so as to extend at least partially, if not fully under the retainer body 23A while being retained between the lace end retainer 23 and the adjuster body 22.

Figure 2A:
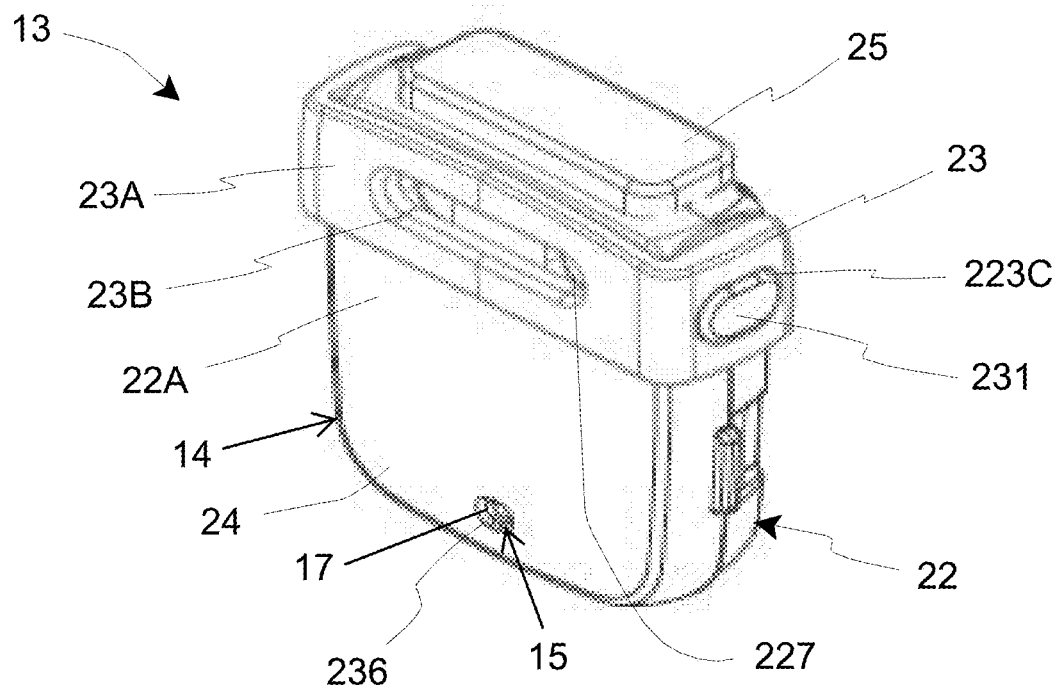
FIG. 2A is a front perspective view of the lace adjuster assembly illustrated in FIG. 1, the lace adjuster being shown in an unlocked configuration.

FIG. 2A is a front perspective view of the lace adjuster assembly 13 illustrated in FIG. 1, the lace adjuster assembly 13 including the lace adjuster 14, and the feedback assembly 15, including one or more of the sensor assembly 216 (illustrated more clearly, for example, in FIG. 2F) and the image assembly 17, that is mechanically coupled to the lace adjuster 14. In some embodiments, the lace adjuster assembly 13 and/or the lace adjuster 14 can be lightweight and water-resistant so that it is comfortable for the user and usable in various environments.

As noted above, the design of the lace adjuster 14 can be varied for purposes of enabling the user to quickly and easily adjust, tighten or loosen the shoelace 12 (illustrated in FIG. 1) of the shoe 10A, 10B (illustrated in FIG. 1). In various embodiments, the lace adjuster 14 can be further configured to inhibit the shoelace 12 from becoming a potential tripping hazard for the user or wearer of the shoe 10A, 10B. In the embodiment illustrated in FIG. 2A, the lace adjuster 14 includes the adjuster body 22 including the first body member 24 and the second body member 25, and the lace end retainer 23 that is coupled to the adjuster body 22.

In certain embodiments, the adjuster body 22, such as the first body member 24 and the second body member 25, is movable between an unlocked configuration wherein the lace adjuster 14 can effectively receive the first lace end 18 (illustrated in FIG. 1) and/or the second lace end 19 (illustrated in FIG. 1) of the shoelace 12, and a locked configuration wherein the lace adjuster 14 retains the first lace end 18 and/or the second lace end 19 so that the lace adjuster 14 is fixed in position and/or is inhibited from moving relative to the shoelace 12. For example, in certain embodiments, the adjuster body 22 can be configured such that the second body member 25 moves relative to the first body member 24 in a plunger-like manner as the adjuster body 22 is being moved between the unlocked configuration and the locked configuration. FIG. 2A illustrates the lace adjuster 14 in the unlocked configuration.

It is appreciated that when the lace adjuster 14 is coupled to the shoelace 12, the shoelace 12 is adjustable relative to the adjuster body 22 when the adjuster body 22 is in the unlocked configuration, and the shoelace 12 is inhibited from being adjusted relative to the adjuster body 22 when the adjuster body 22 is in the locked configuration.

Figure 2B:
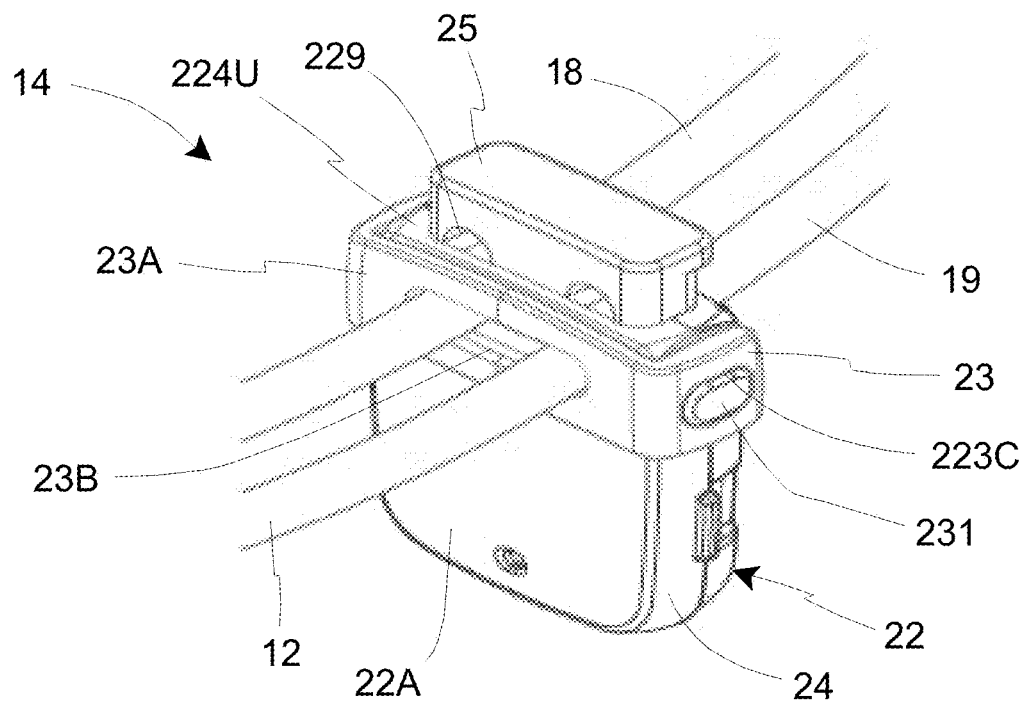
FIG. 2B is a front perspective view of a portion of the shoelace, and the lace adjuster assembly illustrated in FIG. 2A, the lace adjuster being shown in a locked configuration.

FIG. 2B is a front perspective view of a portion of the shoelace 12 (such as a portion of the first lace end 18 and the second lace end 19), and the lace adjuster 14 illustrated in FIG. 2A. As shown in FIG. 2B, the lace adjuster 14 is in the locked configuration. More specifically, the second body member 25 has been moved relative to the first body member 24 such that the first lace end 18 and the second lace end 19 of the shoelace 12 can be effectively retained by the adjuster body 22, such that movement of the shoelace 12 is inhibited relative to the adjuster body 22.

Figure 2C:
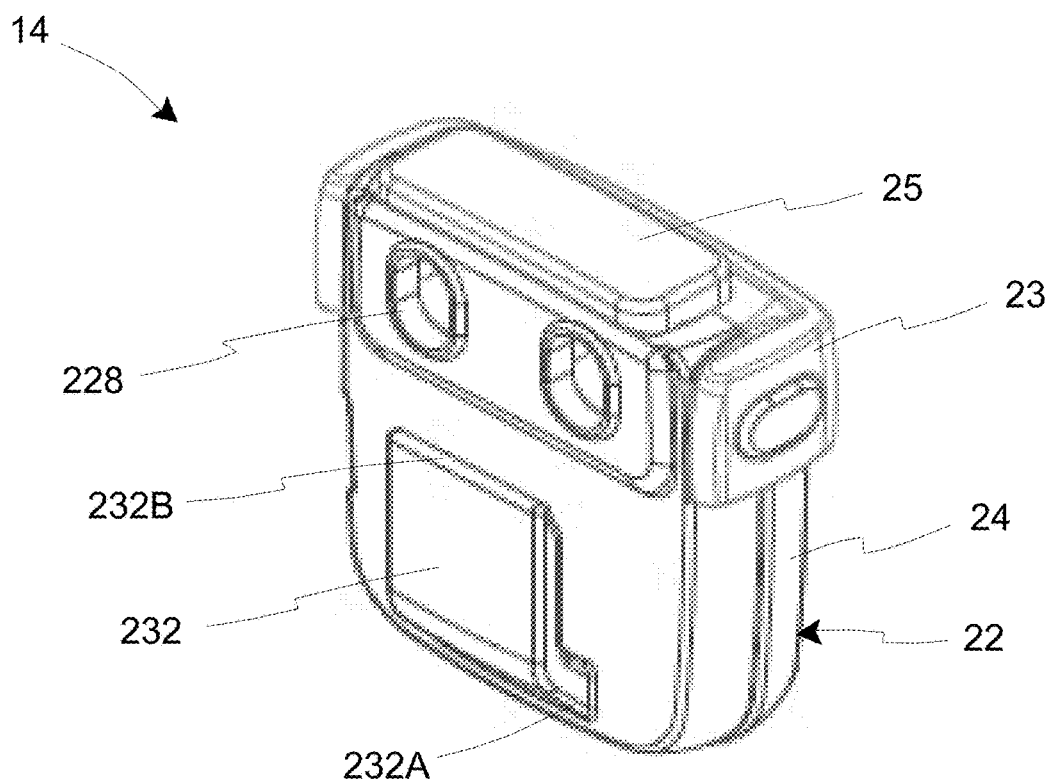
FIG. 2C is a rear perspective view of the lace adjuster assembly illustrated in FIG. 2A, the lace adjuster again being shown in the unlocked configuration.
Figure 2D:
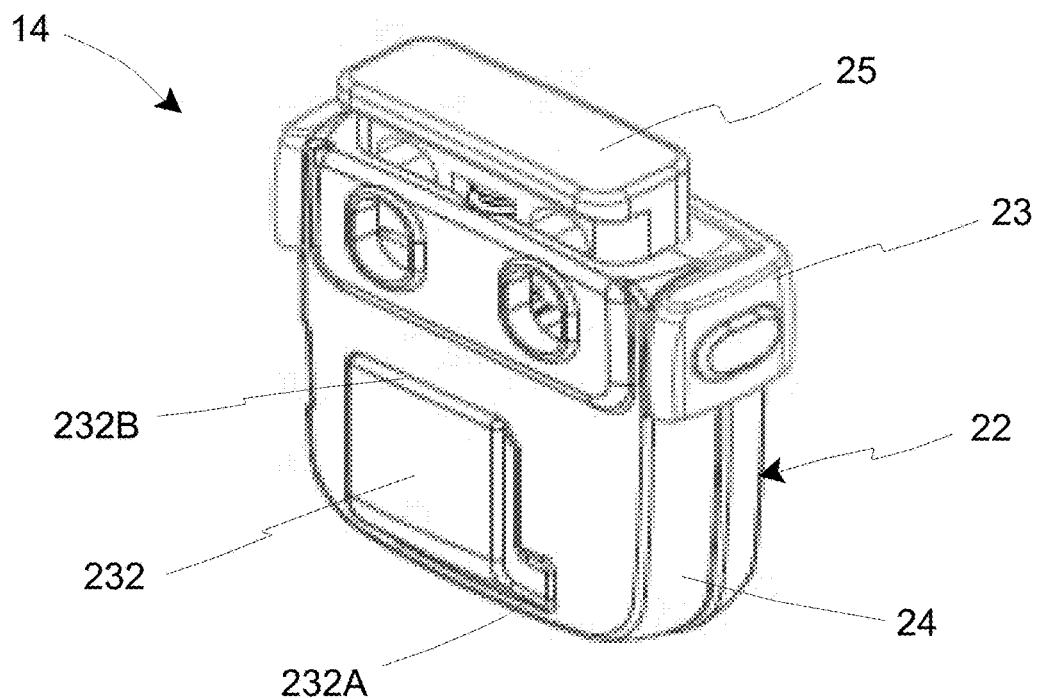
FIG. 2D is a rear perspective view of the lace adjuster assembly illustrated in FIG. 2A, the lace adjuster again being shown in the locked configuration.

FIG. 2C is a rear perspective view of the lace adjuster 14 illustrated in FIG. 2A, the lace adjuster 14 again being shown in the unlocked configuration; and FIG. 2D is a rear perspective view of the lace adjuster 14 illustrated in FIG. 2A, the lace adjuster 14 again being shown in the locked configuration.

Looking at FIGS. 2A-2D together, the first body member 24 includes one or more front apertures 227 (two are illustrated, for example, in FIG. 2A) and one or more rear apertures 228 (two are illustrated, for example, in FIG. 2C), and the second body member 25 includes second apertures 229 (two are illustrated more clearly, for example, in FIG. 2B).

When the lace adjuster 14 is in the process of being coupled to the shoelace 12, the adjuster body 22 and/or the body members 24, 25 are positioned in the unlocked configuration. When in the unlocked configuration, as shown in FIGS. 2A and 2C, the front apertures 227 (illustrated in FIG. 2A) and the rear apertures 228 (illustrated in FIG. 2C) of the first body member 24 are substantially aligned with and concentric with the second apertures 229 (illustrated in FIG. 2B) of the second body member 25. With such design, the first lace end 18 can be positioned to extend through one of the front apertures 227 of the first body member 24, through one of the second apertures 229 of the second body member 25, and through one of the rear apertures 228 of the first body member 24. Similarly, the second lace end 19 can also be positioned to extend through one of the front apertures 227 of the first body member 24, through one of the second apertures 229 of the second body member 25, and through one of the rear apertures 228 of the first body member 24.

Subsequently, when in the locked configuration, as shown in FIGS. 2B and 2D, the second body member 25 extends somewhat away from the first body member 24, and the front apertures 227 (illustrated in FIG. 2A) and the rear apertures 228 (illustrated in FIG. 2C) of the first body member 24 are not substantially aligned with or concentric with the second apertures 229 (illustrated in FIG. 2B) of the second body member 25. Thus, when in the locked configuration, the first lace end 18 (illustrated in FIG. 2B) and the second lace end 19 (illustrated in FIG. 2B) of the shoelace 12 (illustrated in FIG. 2B) can be effectively retained within the lace adjuster 14, such that the first lace end 18 and the second lace end 19 of the shoelace 12 are inhibited from moving relative to the adjuster body 22.

As shown in this embodiment, it is appreciated that the second body member 25 fits partly within and moves up and down (such as when the lace adjuster 14 is oriented vertically) relative to the first body member 24 in a plunger-like manner as the adjuster body 22 is moved between the locked configuration and the unlocked configuration. Stated in another manner, in such embodiment, the first body member 24 is open along a top and into an upper portion 224U (illustrated in FIG. 2B) of the first body member 24 and, as such, is designed to receive at least a portion of the second body member 25 within such open upper portion 224U and to allow the second body member 25 to move up and down over a movement range relative to and/or at least partially within the first body member 24, such that the first body member 24 and the second body member 25 and/or the adjuster body 22 as a whole can move between the locked configuration and the unlocked configuration.

It should be appreciated that the shape of the front apertures 227, the rear apertures 228, and the second apertures 229 can be varied as desired. For example, in some embodiments, the front apertures 227, the rear apertures 228, and/or the second apertures 229 can include one or more tooth-shaped projections 230 (illustrated, for example, in FIG. 2F) that can be utilized to more effectively retain the shoelace 12 when the lace adjuster 14 is in the locked configuration. Alternatively, the front apertures 227, the rear apertures 228, and/or the second apertures 229 can have another suitable design.

As noted above, the lace end retainer 23 is coupled to the adjuster body 22. In some embodiments, the lace end retainer 23 is specifically configured to inhibit the first lace end 18 and/or the second lace end 19 from being a potential tripping hazard by inhibiting the first lace end 18 and/or the second lace end 19 from being moved relative to the lace end retainer 23 and the adjuster body 22 when retained by the lace end retainer 23 by a force generated by a contact pressure of the lace end retainer 23 against a surface 22A of the adjuster body 22.

The lace end retainer 23 can have any suitable design and can be coupled to the adjuster body 22 in any suitable manner. For example, in certain embodiments, as shown in FIGS. 2A and 2B, the lace end retainer 23 can include the retainer body 23A and the retainer aperture 23B that extends through the retainer body 23A. As illustrated, the lace end retainer 23 can be positioned such that the retainer aperture 23B is substantially aligned with the front apertures 227 and the rear apertures 228 formed in the first body member 24 of the adjuster body 22 (and also substantially aligned with the second apertures 229 of the second body member 25 when the adjuster body 22 is in the unlocked configuration). With such design, when the first lace end 18 and/or the second lace end 19 of the shoelace 12 are positioned to extend through the front apertures 227, the second apertures 229 and the rear apertures 228, the lace ends 18, 19 could also easily extend through the retainer aperture 23B. Moreover, when it is desired to effectively retain the first lace end 18 and/or the second lace end 19 with the lace end retainer 23, the first lace end 18 and/or the second lace end 19 can be positioned back through the retainer aperture 23B before being retained, such as pinched, between the retainer body 23A and the surface 22A of the adjuster body 22.

As shown in this embodiment, the lace end retainer 23 can further include at least one first coupling member 223C, such as a coupling aperture that extends through retainer body 23A, with each of the at least one first coupling member 223C being configured to engage a second coupling member 231 of the adjuster body 22, such as a coupling projection that extends away from the adjuster body 22. In one embodiment, the lace end retainer 23 can be configured to extend partially about the adjuster body 22 when the lace end retainer 23 is coupled to the adjuster body 22. In such embodiment, the retainer body 23A can include two first coupling members 223C (such as two coupling apertures), with each of the two first coupling members 223C being positioned about a different second coupling member 231 that extends or projects away from the adjuster body 22. Alternatively, in another such embodiment, the lace end retainer 23 can be configured to extend fully about the adjuster body 22 when the lace end retainer 23 is coupled to the adjuster body 22. In such alternative embodiment, the retainer body 23A can include two first coupling members 223C (such as two coupling apertures), with each of the two first coupling members 223C being positioned about a single second coupling member 231 that extends or projects away from the adjuster body 22. Still alternatively, in still another such embodiment, the lace end retainer 23 can be configured to extend fully about the adjuster body 22 with a general loop-type design, such that the retainer body 23A does not need any coupling apertures and there are no coupling members that extend or project away from the adjuster body 22. Yet alternatively, the lace end retainer 23 can be coupled to the adjuster body 22 in another suitable manner.

The lace end retainer 23 can be formed from any suitable materials. For example, in some embodiments, the lace end retainer 23 is formed from a resilient material, such as rubber or another suitable elastic or resilient material. In such embodiments, the lace end retainer 23 can be stretched at least slightly when the lace end retainer 23 is coupled to the adjuster body 22. With such design, based on the resilient nature of the lace end retainer 23, the lace end retainer 23 is better able to exert a force onto the surface 22A of the adjuster body 22 based on a contact pressure between the lace end retainer 23 and the surface 22A of the adjuster body 22. Thus, the lace end retainer 23 is better able to pinch the first lace end 18 and/or the second lace end 19 between the lace end retainer 23 and the surface 22A of the adjuster body 22. Alternatively, the lace end retainer 23 can be formed from another suitable material.

Referring now to FIGS. 2C and 2D, as shown, the lace adjuster 14 can further include a motion restrictor 232 that is coupled to and cantilevers away from the adjuster body 22. In particular, in this embodiment, the motion restrictor 232 includes a first restrictor end 232A that is secured to the first body member 24 and a second restrictor end 232B that is spaced apart from and/or is not directly secured to the first body member 24. With the design illustrated in the Figures, the motion restrictor 232 is designed similar to a spring-type clip, which is configured to extend underneath at least a portion of the shoelace 12 (illustrated in FIG. 2B) so that at least a portion of the motion restrictor 232 is positioned substantially directly between the shoelace 12 and the shoe body 11 (illustrated in FIG. 1) of the shoe 10A, 10B (illustrated in FIG. 1). Thus, the lace adjuster 14 is inhibited from bouncing around and is held more firmly in position when coupled to the shoelace 12 and when the user is engaging in various types of activities.

Figure 2E:
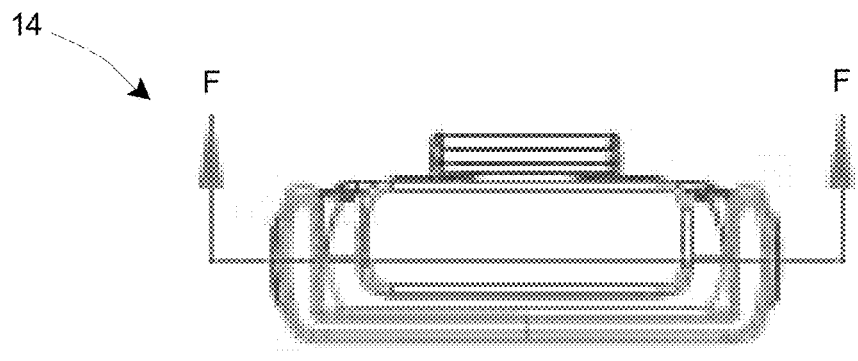
FIG. 2E is a top view of the lace adjuster illustrated in FIG. 2A.
Figure 2F:
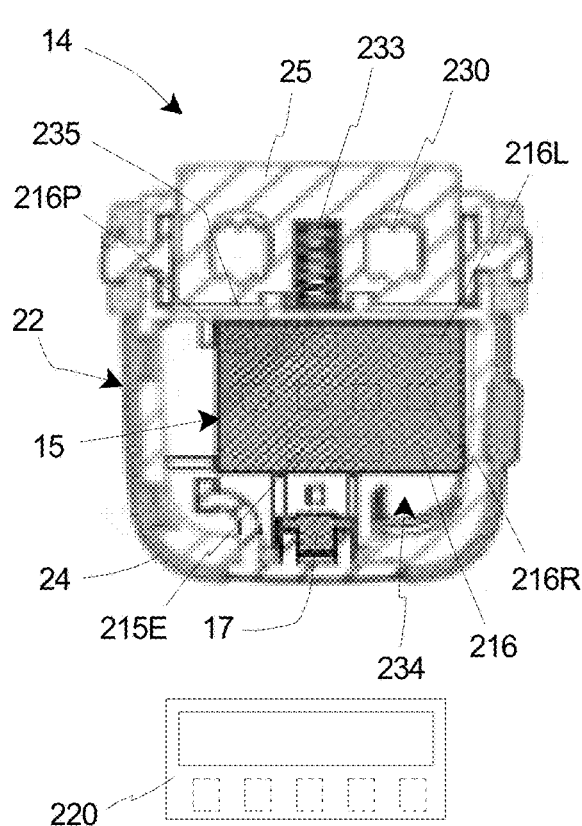
FIG. 2F is a cutaway view of the lace adjuster assembly taken on line F-F in FIG. 2E, the lace adjuster being shown in the unlocked configuration.
Figure 2G:
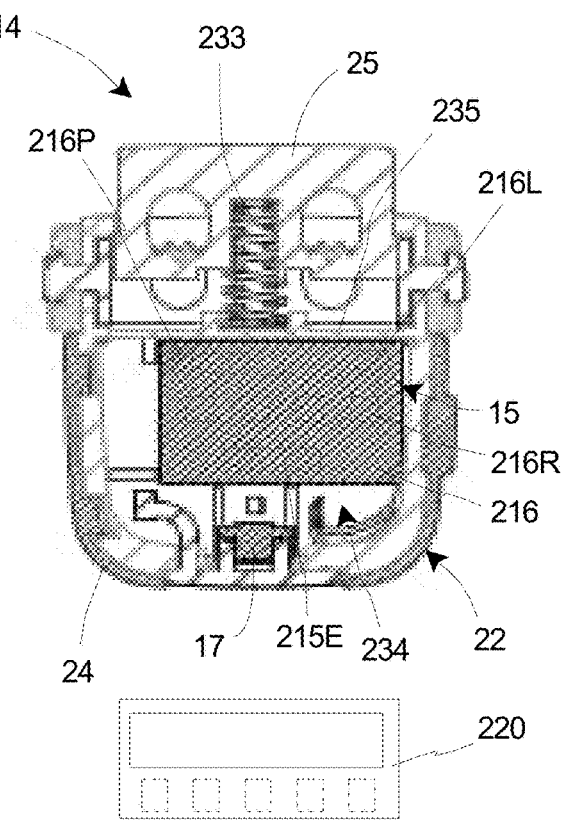
FIG. 2G is a sectional view of the lace adjuster assembly illustrated in FIG. 2A, the lace adjuster being shown in the locked configuration.

FIG. 2E is a top view of the lace adjuster 14 illustrated in FIG. 2A; FIG. 2F is a cutaway view of the lace adjuster 14 taken on line F-F in FIG. 2E, the lace adjuster 14 being shown in the unlocked configuration; and FIG. 2G is a comparable sectional view of the lace adjuster 14 illustrated in FIG. 2A, the lace adjuster 14 being shown in the locked configuration. As shown, FIGS. 2E-2G illustrate certain additional features or components that can be included in certain embodiments of the lace adjuster 14.

For example, FIGS. 2F and 2G illustrate certain additional aspects of the movement of the lace adjuster 14, such as the relative movement of the first body member 24 and the second body member 25 of the adjuster body 22, between the unlocked configuration and the locked configuration. More specifically, as illustrated, the first body member 24 and the second body member 25 are resiliently coupled to one another with one or more resilient members 233 (only one is illustrated in this example). In particular, the resilient member 233 is connected to and extends between the first body member 24 and the second body member 25 to enable the adjuster body 22 to resiliently move between the unlocked configuration and the locked configuration. It is appreciated that the resilient member 233 can be connected to each of the first body member 24 and the second body member 25 in any suitable manner. For example, in one non-exclusive embodiment, each of the first body member 24 and the second body member 25 can include a member receiver (not shown) that is adapted to receive and retain a portion of the resilient member 233 in order to secure the resilient member 233 to the first body member 24 and the second body member 25, respectively. Alternatively, the resilient member 233 can be connected to the first body member 24 and/or the second body member 25 in another suitable manner.

The design of the resilient member 233 can be varied depending on the requirements of the lace adjuster 14. For example, in the embodiment illustrated in FIGS. 2F and 2G, the resilient member 233 is a spring. In one embodiment, the resilient member 233 is a stiff spring that can hold the first body member 24 and the second body member 25 substantially straight relative to one another to ease the movement of the body members 24, 25 between the locked configuration and the unlocked configuration. Alternatively, the resilient member 233 can be another piece of resilient material.

In this embodiment, the resilient member 233 urges the second body member 25 up and/or away relative to the first body member 24 so that the adjuster body 22 is urged and/or biased toward the locked configuration. Alternatively, the resilient member 233 can be designed to urge the second body member 25 within the first body member 24 so that the adjuster body 22 is urged and/or biased toward the unlocked configuration. In such alternative embodiment, the lace adjuster 14 would further require a locking mechanism (not illustrated) that would maintain the first body member 24 and the second body member 25 in the locked configuration. In these alternative embodiments, the resilient member 233 is either extended or compressed as the first body member 24 and the second body member 25 are moved between the locked configuration and the unlocked configuration. Still alternatively, in one embodiment, the lace adjuster 14 can further include a stop (not shown) that inhibits and/or stops relative movement between the body members 24, 25 so that the body members 24, 25 are inhibited from moving beyond the desired positioning for the body members 24, 25 when in the locked configuration and the unlocked configuration. It is appreciated that in such embodiments the stop can be positioned in different manners depending on in which direction the resilient member 233 is biased.

In certain embodiments, the lace adjuster 14 can further include a guide system (not shown) that guides relative movement between the first body member 24 and the second body member 25 as the adjuster body 22 is moved between the unlocked configuration and the locked configuration. In such embodiments, the guide system can have any suitable design that enables controlled relative movement between the first body member 24 and the second body member 25 as the adjuster body 22 is moved between the unlocked configuration and the locked configuration. Alternatively, in other embodiments, the lace adjuster 14 can be designed without a specific guide system. In some such alternative embodiments, as noted above, the relative movement between the body members 24, 25 can be guided through use of the stiff spring as the resilient member 233.

As shown in FIGS. 2F and 2G, the lace adjuster 14 can further include the feedback assembly 15, including the sensor assembly 216 and/or the image assembly 17, that is mechanically coupled to the adjuster body 22 and/or another portion of the lace adjuster 14. In particular, in this embodiment, the feedback assembly 15 is positioned substantially within a body cavity 234 that is formed within the adjuster body 22. In some embodiments, the body cavity 234 can be provided in the form of a sealed and/or water-resistant chamber that can be utilized to provide greater protection from the surrounding environment for the feedback assembly 15. Alternatively, the feedback assembly 15 can be mechanically coupled to another portion of the lace adjuster 14 and/or the adjuster body 22. For example, in certain non-exclusive alternative embodiments, the lace adjuster 14 can include an adjuster cover plate 238 (illustrated in FIG. 2J) that is coupled to the adjuster body 22, and at least a portion of the feedback assembly 15 can be mechanically coupled to the adjuster cover plate 238.

In certain embodiments, the body cavity 234 can be formed, at least in part, within and/or adjacent to the first body member 24. Alternatively, in other embodiments, the body cavity 234 can be formed, at least in part, between the first body member 24 and the second body member 25 of the adjuster body 22. Still alternatively, the feedback assembly 15 can be positioned on, coupled to and/or incorporated within the lace adjuster 14 in another suitable manner.

In some embodiments, the adjuster body 22 can further include a separator 235, such as a separation wall, that can be used to isolate the body cavity 234, within which the feedback assembly 15 is retained, from the open upper portion 224U (illustrated in FIG. 2B) of the first body member 24, within which the second body member 25 moves during movement of the adjuster body 22 between the unlocked configuration and the locked configuration. With such design, the feedback assembly 15 can be better protected from the surrounding environment.

As described herein, the feedback assembly 15 is usable by the user to provide statistical data and/or images of the user, such as during an athletic performance, in order to effectively gauge various aspects of their athletic performance. In some embodiments, the feedback assembly 15 can be substantially similar in design and function to the feedback assemblies that are incorporated within the lace adjusters illustrated and described in U.S. Pat. No. 10,595,581 B2 issued on Mar. 24, 2020, and entitled "LACE ADJUSTER ASSEMBLY INCLUDING FEEDBACK ASSEMBLY FOR USE IN VISUALIZING AND MEASURING ATHLETIC PERFORMANCE", and/or in U.S. application Ser. No. 17/354,655 filed on Jun. 22, 2021, and entitled "LACE ADJUSTER", which have, to the extent allowable, been incorporated herein in their entirety.

In some embodiments, the sensor assembly 216 can be uniquely designed to incorporate one or more performance sensors 216P that are configured to sense various performance characteristics for the user during an athletic performance. The sensed performance characteristics can be subsequently utilized to provide the athlete or user who is using the sensor assembly 216, such as in conjunction with the lace adjuster 14, with statistical data and/or performance measurables that enable the athlete to effectively gauge various aspects of their athletic performance. For example, in certain embodiments, the one or more performance sensors 216P can include one or more two-axis accelerometers, a three-axis accelerometer, a three-axis gyrometer (or gyroscope) and/or another type of rate sensor, and/or a three-axis magnetometer. Additionally, and/or alternatively, the one or more performance sensors 216P can include additional appropriate sensor types. Further, in some embodiments, the sensor assembly 216 can also include a real-time clock 216R that enables more accurate time tracking.

In different embodiments, as noted above, the sensor assembly 216 can include the one or more performance sensors 216P in order to provide sensed performance characteristics that are usable to derive statistical data that relates to substantially horizontal movements of the athlete, substantially vertical movements of the athlete, angular and/or rotational movements of the athlete, and/or energy, intensity and force expenditures by the athlete during the performance of an athletic activity. For example, in certain embodiments, the sensor assembly 216 and/or the performance sensors 216P can provide the athlete with sensed performance characteristics that are usable to derive statistical data related to number of steps taken, total distance traveled, distance traveled per step (such as stride length), stride duration, ground contact duration and pattern, foot acceleration and foot angle during strides (gait tracking), speed of travel, horizontal burst (such as sudden acceleration from an average rate of speed), number of jumps, height of jumps, jump duration, vertical burst (such as take-off velocity or acceleration for a jump), number of accelerations (relating to horizontal burst and/or vertical burst), angular, twisting or rotational movements of the athlete (and/or the speed of such movements), energy expended during athletic performance (such as in kcal), and/or force expended during athletic performance (such as in psi, kpi, or other force measurements). In some embodiments, the sensor assembly 216 and/or the performance sensors 216P can also provide the athlete with sensed performance characteristics that are usable to derive average, minimum and maximum values for any of the noted statistical data points that are generated during the performance of an athletic activity. In many embodiments, the sensor assembly 216 and/or the performance sensors 216P can further provide the athlete with sensed performance characteristics that are usable to derive other desired statistical data. In some embodiments, the statistical data that is provided by the sensor assembly 216 can be subsequently utilized by the athlete to tailor their training programs and schedules with the goal of ultimately improving their athletic performance. Moreover, the athlete can further compare the statistical data gathered during different and/or subsequent athletic performances to better evaluate any changes of performance measurables.

It is appreciated that any and all of the performance characteristics measured and/or sensed by the one or more performance sensors 216P can be combined in any suitable manner to enable the generation of various statistical data and/or performance measurables for the athlete during the performance of an athletic activity or event. It is further appreciated that in order to more effectively evaluate the various statistical data from the athletic performances, the athlete may desire to provide certain input information, such as the height and weight of the athlete. In one embodiment, the athlete may manually input such information as height and weight into the sensor assembly 216 via a remote device 220 (illustrated as a box that is not to scale), such as a smartphone, a smart watch, a tablet, a computer, and/or any other suitable computing device. Alternatively, information such as the height and weight of the athlete can be provided to the sensor assembly 216 in another suitable manner. This information can further be utilized to see the effects of people's height and weight on the performance data. It is also appreciated that any statistical data related to energy expended and/or force expended can require information such as the weight of the athlete in order for such statistical data to be accurately generated.

In certain embodiments or applications, the sensor assembly 216 can additionally and/or alternatively include the one or more locational sensors 216L, such as GPS sensors, for providing accurate and precise locational information that can be used by the individual wearing the lace adjuster 14. For example, in certain non-exclusive alternative applications, the locational sensors 216L can be utilized for purposes of navigation and/or the locational sensors 216L can be utilized for purposes of tracking movements of the user. With such applications, the individual wearing the lace adjuster 14 always knows where he or she is, as well as where he or she needs to go to reach any desired destination. In such uses, the locational sensors 216L can be utilized to inhibit the person wearing the lace adjuster 14 from getting lost and/or to enable the wearer to follow a prescribed trail, such as during an adventure race or when exploring the wilderness. Moreover, the locational sensors 216L can offer a sense of security for someone, such as a parent or guardian, who is charged with care for and/or monitoring of the individual wearing the lace adjuster 14. In such applications, the locational information from the locational sensors 216L can be wirelessly transmitted to the remote device 220 so that the user and/or the parent or guardian can always have the accurate and precise locational information of the person wearing the lace adjuster 14. The locational sensors 216L can also be used to track the movement of the user. For example, the route ran or biked can be recorded and stored for future analysis. Other information, such as time and altitude can also be recorded and stored for future analysis.

Moreover, as described herein below, in some applications, the locational sensors 216L can be utilized in conjunction with additional locational sensors, such as GPS sensors, or beacons that are positioned remotely from the lace adjuster 14, such as being positioned on or near an athletic field or court, to more precisely and accurately provide locational information for the user.

The image assembly 17, such as a digital camera in some embodiments, can be configured and/or positioned to provide the user with unique viewpoints from which the user is able to visualize and/or evaluate various aspects of their athletic performance. For example, in different embodiments, depending upon the specific positioning and orientation of the image assembly 17 during use, the user is able to effectively capture, review and analyze images (such as still images and/or video images) of themselves demonstrating unique perspectives and angles of their athletic performance. For example, the image assembly 17 can provide low-resolution or high-resolution images or video (and sound). The images or video can be transmitted via Wi-Fi, Bluetooth, or a USB port. In certain embodiments, the images or video can be transmitted for a TV broadcast during a performance or game. The image assembly 17 can be controlled by a button on the lace adjuster 14 or it can be remotely controlled.

In certain embodiments, the image assembly 17 can be directed in a generally upward or outward direction from the shoe 10A, 10B (illustrated in FIG. 1) to capture the desired images or video. With such design, the user may be able to gather unique insights into their athletic performance, which would not otherwise be available from remote positioning of an image capturing assembly. Alternatively, the image assembly 17 can be directed in a different direction. In certain embodiments, the direction of where the image assembly 17 is directed can be controlled and/or adjusted by the user, and/or can be controlled remotely by another individual.

In some embodiments, the adjuster body 22 can include an imaging aperture 236 (illustrated in FIG. 2A) through which the image assembly 17 is able to capture images of the user during use.

It is appreciated that through use of the motion restrictor 232 (illustrated in FIG. 2C), which inhibits the lace adjuster 14 from bouncing around during use, the feedback assembly 15 is able to provide more precise, accurate and clear sensed information from the sensor assembly 216 and images from the image assembly 17.

Moreover, it is appreciated that any information from the feedback assembly 15, such as from the sensor assembly 216 and/or the image assembly 17, can be downloaded or transmitted into the remote device 220 in any suitable manner. For example, in certain embodiments, the information from the feedback assembly 15, such as from the sensor assembly 216 and/or the image assembly 17, can be downloaded or transmitted into the remote device 220 via Bluetooth, Wi-Fi, or another suitable connection. It is further appreciated that any such information from the feedback assembly 15 can be downloaded or transmitted to the remote device 220 wirelessly or via a wired connection. Certain specific embodiments of the feedback assembly 15, including the sensor assembly 216 and/or the image assembly 17, and the remote device 220 will be described in greater detail herein below in relation to FIGS. 3 and 4.

In some embodiments, a power source 215E (illustrated as a box in phantom) can be included to provide necessary power for both the sensor assembly 216 and the image assembly 17 of the feedback assembly 15; or a separate power source can be included for each of the sensor assembly 216 and the image assembly 17 of the feedback assembly 15.

The power source 215E can have any suitable design for purposes of providing necessary power for both the sensor assembly 216 and the image assembly 17 of the feedback assembly 15. For example, in some embodiments, the power source 215E can include one or more batteries. In a specific example, the one or more batteries can be selectively recharged via the connector port 221 (illustrated in FIG. 2I). Additionally, or in the alternative, the connector port 221 can be used for other suitable purposes. For example, in some alternative embodiments, the connector port 221 can also be utilized for purposes of transmitting information from the lace adjuster 14 to the remote device 220. Still alternatively, in some embodiments, the power source 215E can be charged remotely.

Figure 2H:
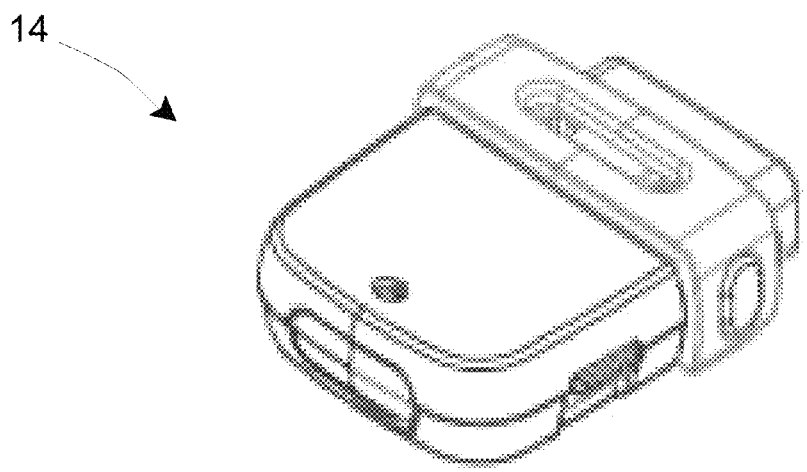
FIG. 2H is a front perspective view of the lace adjuster assembly illustrated in FIG. 2A.

FIG. 2H is a front perspective view of the lace adjuster 14 illustrated in FIG. 2A.

Figure 2I:
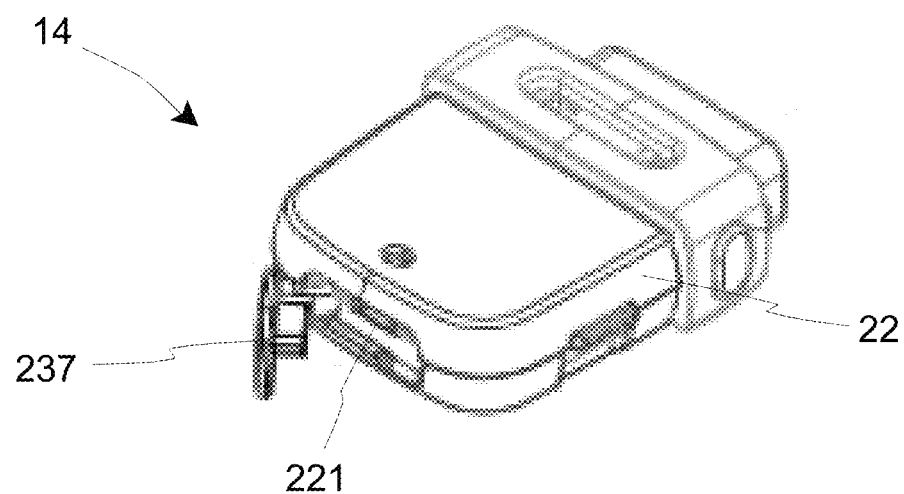
FIG. 2I is another front perspective view of the lace adjuster assembly illustrated in FIG. 2A.

FIG. 2I is another front perspective view of the lace adjuster 14 illustrated in FIG. 2A. As shown in FIG. 2I, the lace adjuster 14 includes a port cover 237 that is coupled to the adjuster body 22, and that can be selectively opened to reveal the connector port 221 that is usable for charging the power source 215E (illustrated, for example, in FIG. 2F), and/or for transmitting information from the feedback assembly 15 (illustrated, for example, in FIG. 2F) to the remote device 220 (illustrated, for example, in FIG. 2F), such as a smartphone, a smart watch, a tablet, a computer, and/or any other suitable computing device.

Figure 2J:
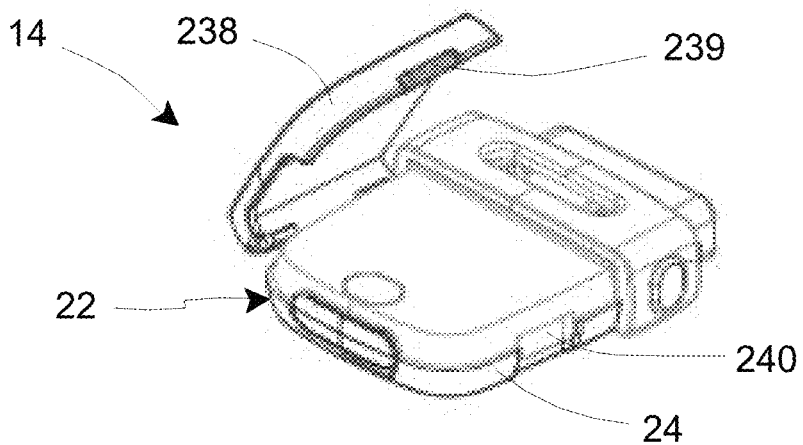
FIG. 2J is still another front perspective view of the lace adjuster assembly illustrated in FIG. 2A.

FIG. 2J is still another front perspective view of the lace adjuster 14 illustrated in FIG. 2A. As shown, FIG. 2J illustrates one or more additional features of the lace adjuster 14, such as the selective coupling of an adjuster cover plate 238 to the first body member 24 so as to form a portion of the adjuster body 22. In some embodiments, the adjuster cover plate 238 can include a design (not shown) so as to give the lace adjuster 14 a more interesting appearance. In various embodiments, the adjuster cover plate 238 can be interchangeable with other alternative adjuster cover plates so that the lace adjuster 14 can have any desired design as included within the adjuster cover plate 238.

It is appreciated that the adjuster cover plate 238 can be selectively attached to and detached from the first body member 24 and/or the adjuster body 22 in any suitable manner. For example, in certain embodiments, the adjuster cover plate 238 can include a first attachment member 239 that is configured to selectively engage a second attachment member 240 that is coupled to and/or included within the first body member 24 or another portion of the adjuster body 22. In one such embodiment, the first attachment member 239 can include a hook-type element that is configured to engage a groove-type element of the second attachment member 240. Alternatively, the first attachment member 239 can include a groove-type member that is configured to be engaged by a hook-type member of the second attachment member 240. Still alternatively, the first attachment member 239 and/or the second attachment member 240 can have another suitable design.

It is appreciated that in various embodiments, the adjuster cover plate 238 can include two first attachment members 239 and the first body member 24 (or other portion of the adjuster body 22) can include two second attachment members 240 so that the adjuster cover plate 238 is selectively attachable to the first body member 24 and/or the adjuster body 22 on two spaced apart locations, such as on opposing sides of the adjuster body 22. It is further appreciated that the adjuster cover plate 238 can be attached to the adjuster body 22, such as to the first body member 24, at more than one place on each side of the adjuster body 22. For example, in one such alternative embodiment, the adjuster cover plate 238 can be attached to the first body member 24 at one place on one side of the adjuster body 22, and the adjuster cover plate 238 can be attached to the first body member 24 at two spaced apart places on the other side of the adjuster body 22.

Yet alternatively, the adjuster cover plate 238 can be hingedly coupled to the adjuster body 22 on one side of the adjuster cover plate 238. With such design, the adjuster cover plate 238 can be moved relative to the adjuster body 22, such as similar to the opening of a door, to provide access to the feedback assembly 15 (illustrated in FIG. 2F) that is positioned substantially within the body cavity 234 (illustrated in FIG. 2F), which in certain embodiments can be defined between the first body member 24 and the adjuster cover plate 238. Moreover, in certain embodiments, the feedback assembly 15 can be coupled to, or positioned on and/or substantially adjacent to the adjuster cover plate 238.

Additionally, or in the alternative, the lace adjuster 14 that includes such interchangeable adjuster cover plates 238 can be designed such as is illustrated and described in U.S. Pat. No. 10,512,304 B2 issued on Dec. 24, 2019, and entitled "LACE ADJUSTER WITH INTERCHANGEABLE COVERS", which has, to the extent allowable, been incorporated herein in its entirety.

Moreover, in certain embodiments, the lace adjuster 14 can further include a light assembly (not shown) including one or more lights (not shown), such as LED lights, that can be mounted on and/or positioned substantially adjacent to the adjuster cover plate 238 or another component of the lace adjuster 14. In particular, in some such embodiments, the lights can be coupled to the adjuster cover plate 238 and/or can be positioned such that the lights can shine and/or extend through one or more light apertures (not shown) in the adjuster cover plate 238. Such lights can also be positioned so as to more effectively and dramatically draw attention to the design on the adjuster cover plate 238 and/or to provide desired lighting for someone using the lace adjuster 14 in less favorable lighting situations, such as at night. Additionally, and/or alternatively, the light assembly and/or the lights can be positioned in a different area of the lace adjuster 14.

Figure 2K:
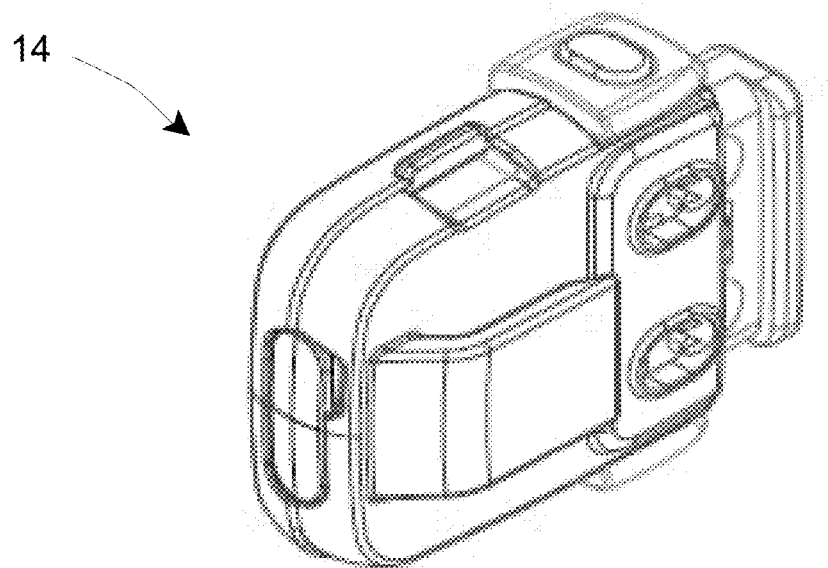
FIG. 2K is a rear perspective view of the lace adjuster assembly illustrated in FIG. 2A.
Figure 2L:
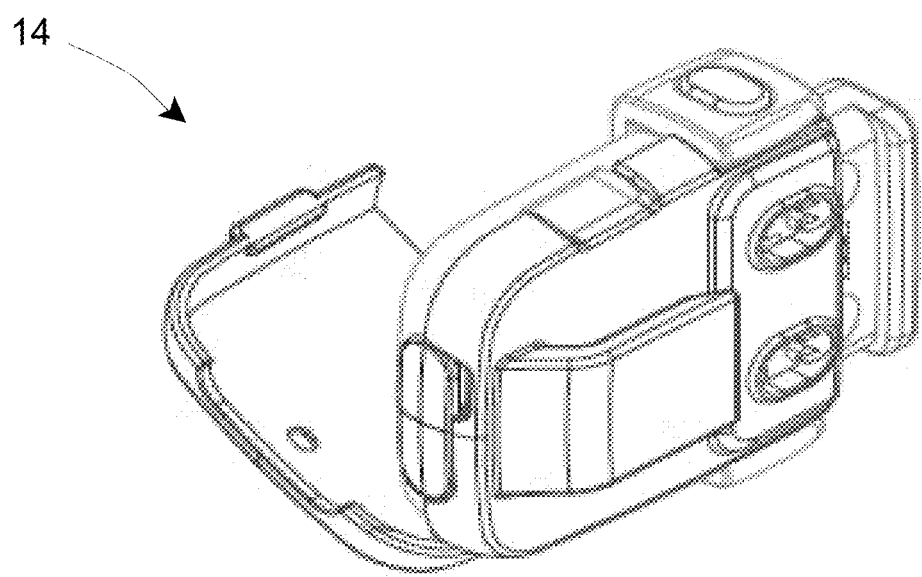
FIG. 2L is another rear perspective view of the lace adjuster assembly illustrated in FIG. 2A.
Figure 2M:
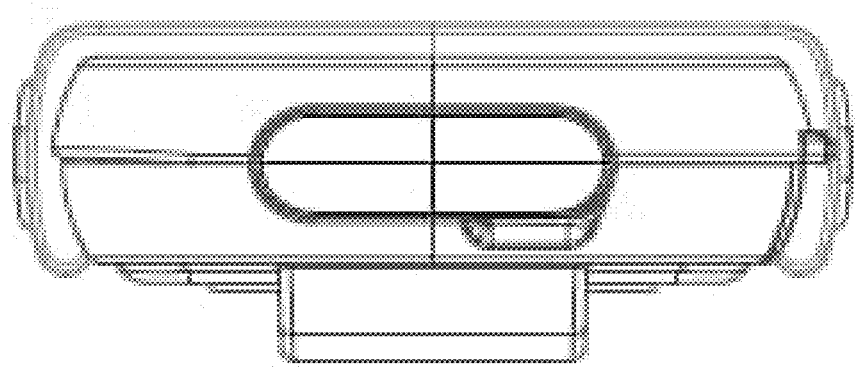
FIG. 2M is a bottom view of the lace adjuster assembly illustrated in FIG. 2A.
Figure 2N:
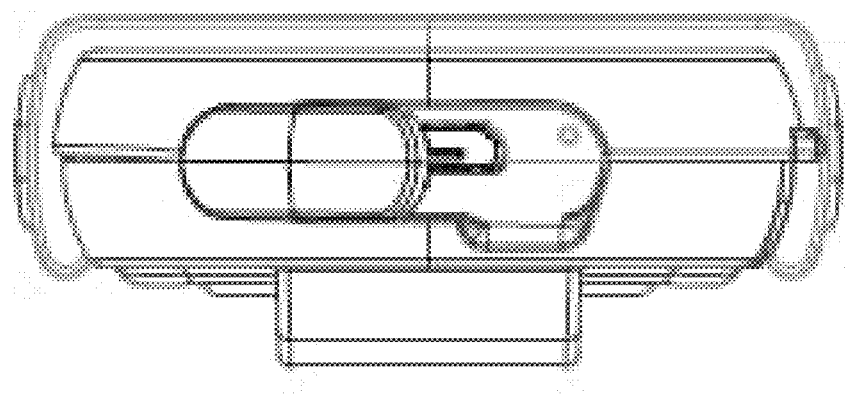
FIG. 2N is another bottom view of the lace adjuster assembly illustrated in FIG. 2A.
Figure 2O:
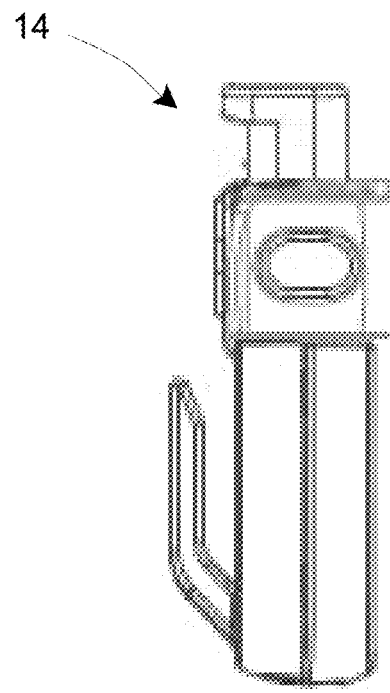
FIG. 2O is a side view of the lace adjuster assembly illustrated in FIG. 2A.
Figure 2P:
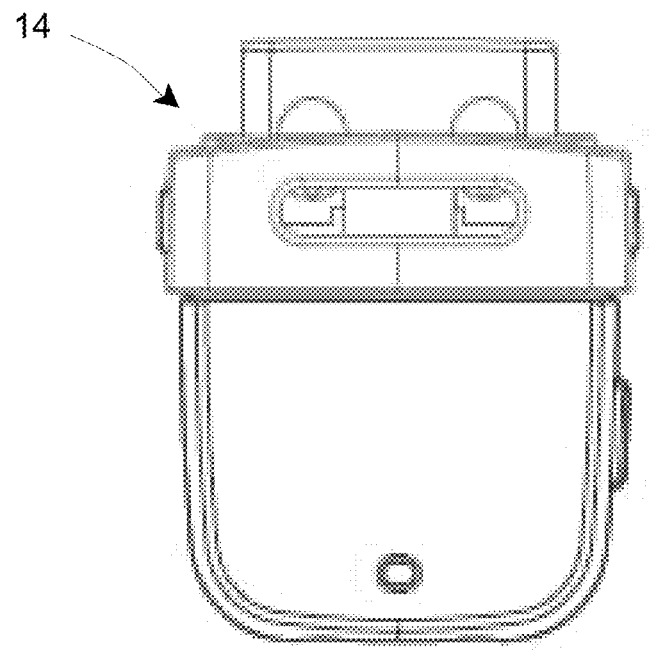
FIG. 2P is a front view of the lace adjuster assembly illustrated in FIG. 2A.
Figure 2Q:
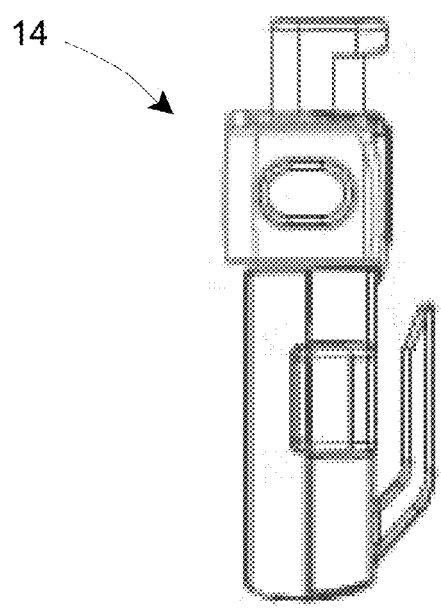
FIG. 2Q is another side view of the lace adjuster assembly illustrated in FIG. 2A.
Figure 2R:
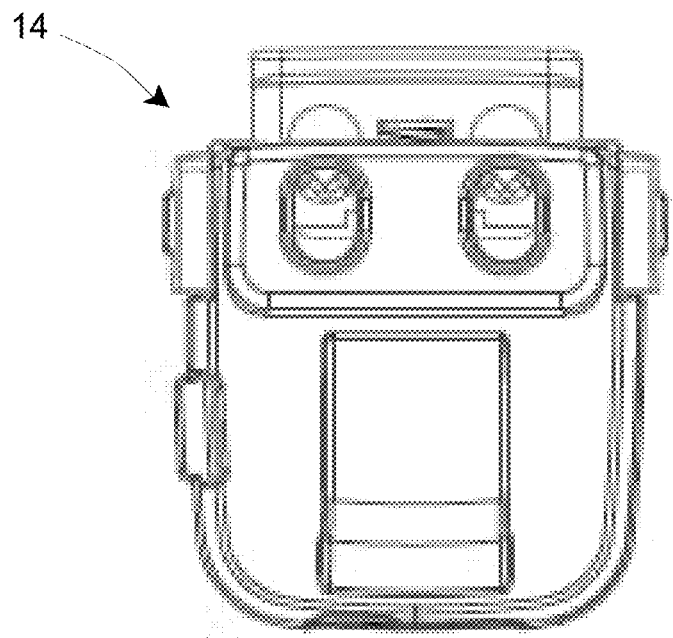
FIG. 2R is a rear view of the lace adjuster assembly illustrated in FIG. 2A.

FIGS. 2K-2R illustrate certain additional views of the lace adjuster 14 illustrated in FIG. 2A, and thus provide different vantage points of various features and components of the lace adjuster 14. In particular, FIG. 2K is a rear perspective view of the lace adjuster 14 illustrated in FIG. 2A; FIG. 2L is another rear perspective view of the lace adjuster 14 illustrated in FIG. 2A; FIG. 2M is a bottom view of the lace adjuster 14 illustrated in FIG. 2A; FIG. 2N is another bottom view of the lace adjuster 14 illustrated in FIG. 2A; FIG. 2O is a side view of the lace adjuster 14 illustrated in FIG. 2A; FIG. 2P is a front view of the lace adjuster 14 illustrated in FIG. 2A; FIG. 2Q is another side view of the lace adjuster 14 illustrated in FIG. 2A; and FIG. 2R is a rear view of the lace adjuster 14 illustrated in FIG. 2A.

Figure 3:
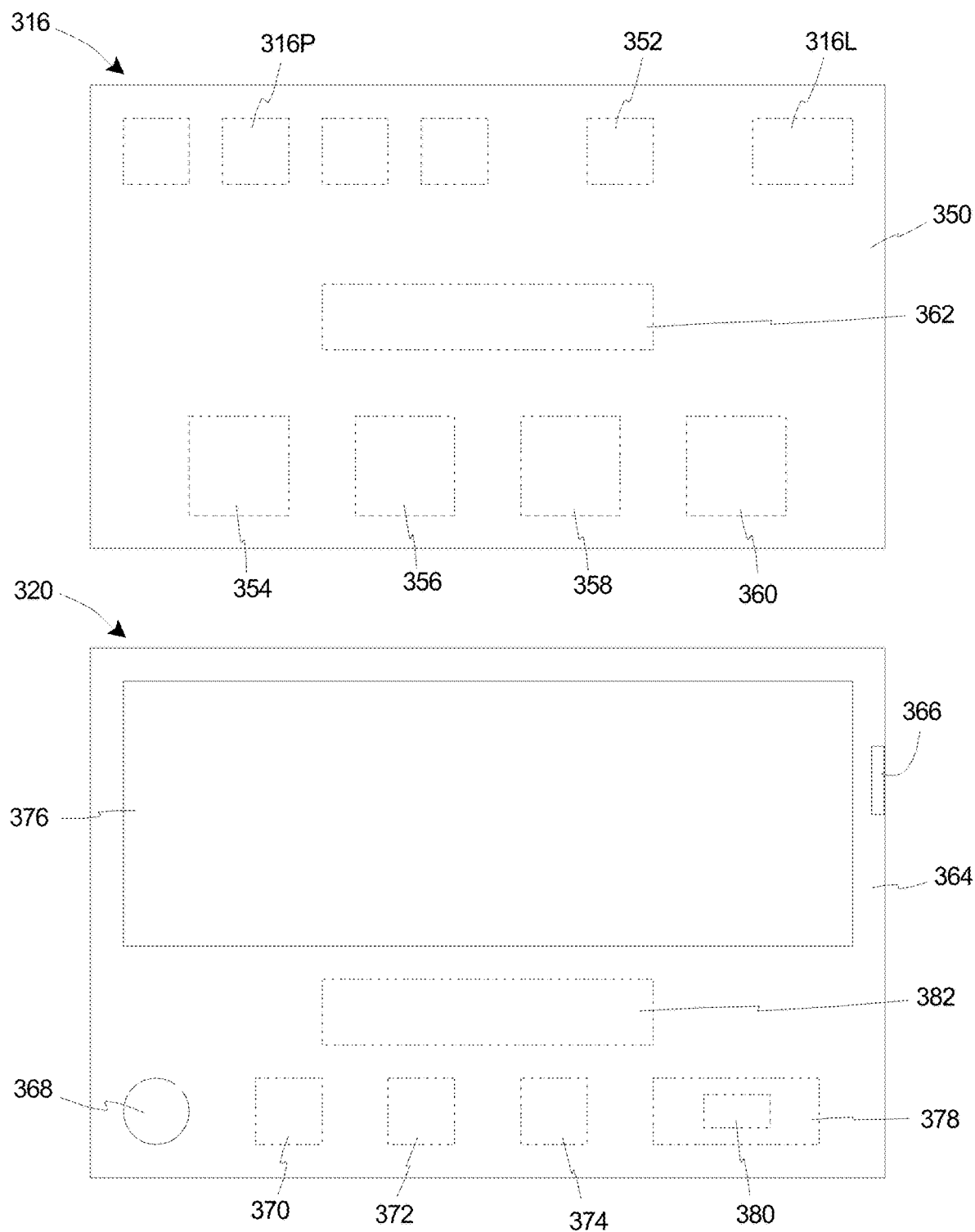
FIG. 3 is a simplified schematic illustration of an embodiment of the sensor assembly.

FIG. 3 is a simplified schematic illustration of an embodiment of the sensor assembly 316. FIG. 3 further includes a simplified schematic illustration of an embodiment of the remote device 320 that can be utilized in conjunction with and/or as part of the sensor assembly 316. This sensor assembly 316 can be used in each of the lace adjuster assemblies 13 illustrated in FIG. 1.

The design of the sensor assembly 316 can be varied. For example, as illustrated in FIG. 3, the sensor assembly 316 can include an assembly body 350, one or more performance sensors 316P (four are illustrated as boxes in phantom in FIG. 3), one or more locational sensors 316L (illustrated as a box in phantom), a real-time clock 352 (illustrated as a box in phantom) a storage device 354 (illustrated as a box in phantom), a transmitter 356 (illustrated as a box in phantom), a receiver 358 (illustrated as a box in phantom), a controller 360 (illustrated as a box in phantom), and a power source 362 (illustrated in phantom). As shown, in this embodiment, each of the one or more performance sensors 316P, the one or more locational sensors 316L, the real-time clock 352, the storage device 354, the transmitter 356, the receiver 358, the controller 360, and the power source 362 can be coupled to and/or positioned substantially within the assembly body 350. The design of each of these components can be varied to suit the design requirements of the sensor assembly 316. Alternatively, the sensor assembly 316 can have another suitable design, which can comprise more or fewer components than those specifically illustrated in FIG. 3. Still alternatively, one or more of the components can be provided remotely from the assembly body 350.

As shown, in one embodiment, the assembly body 350 can provide a housing for the one or more performance sensors 316P, the one or more locational sensors 316L, the real-time clock 352, the storage device 354, the transmitter 356, the receiver 358, the controller 360, and the power source 362. The design of the assembly body 350 can be varied. For example, in one embodiment, the assembly body 350 is substantially rectangular box-shaped. Alternatively, the assembly body 350 can have another suitable shape.

As noted above, the sensor assembly 316 can provide the athlete with various statistical data and/or performance measurables that enable the athlete to effectively gauge various aspects of their athletic performance. In order to effectively provide such statistical data and/or performance measurables, the sensor assembly 316 needs the one or more performance sensors 316P and the one or more locational sensors 316L to encompass certain features in order to sense the appropriate performance variables. For example, in certain embodiments, the one or more performance sensors 316P can include one or more two-axis accelerometers, a three-axis accelerometer, a three-axis gyrometer (or gyroscope) and/or another type of rate sensor, and/or a three-axis magnetometer. In some embodiments, the one or more performance sensors 316P can include additional appropriate sensor types.

As discussed herein, the one or more performance sensors 316P can be effectively utilized to sense various performance characteristics, which can be subsequently utilized to derive and/or generate usable statistical data and/or performance measurables for the athlete. For example, the two-axis accelerometers can be utilized to measure and/or sense acceleration of the athlete during his or her performance along two axes. More specifically, one two-axis accelerometer can be utilized to measure and/or sense acceleration of the athlete along the horizontal axes (such as the X axis and the Y axis); and other two-axis accelerometers can be utilized to measure and/or sense acceleration of the athlete along one horizontal axis (such as either the X axis or the Y axis) and the vertical axis (such as the Z axis). The three-axis accelerometer can be utilized to measure and/or sense acceleration of the athlete along all three axes (such as along the X axis, the Y axis, and the Z axis). It should be appreciated that by comparing the performance characteristics measured and/or sensed by the three-axis accelerometers to the performance characteristics measured and/or sensed by each of the two-axis accelerometers (such as by subtracting two-axis data from the three-axis data), accurate acceleration data can be determined along each individual axis to effectively isolate vertical and horizontal acceleration of the athlete.

The three-axis gyrometer (or gyroscope) or other type of rate sensor can be utilized to measure and/or sense orientation information for the athlete in three dimensions (such as about the X axis, the Y axis, and the Z axis) as a means to ultimately provide usable data with regard to angular movements of the athlete (such as twist and rotation) during performance of the athletic activity or event.

The three-axis magnetometer can be utilized to sense and/or track the Earth's magnetic field, and thus to measure the strength (such as magnitude) and direction of magnetic fields at a point in space in relation to the various movements of the athlete.

Using foot acceleration measurements, the sensor assembly 316 can then estimate the foot position in space relative to the ground. The sensor assembly 316 can then extract metrics such as stride duration, stride length, ground contact (foot strike) duration, foot angles (at all times through strides, including foot strike angles), etc., which are what coaches need to track performance. For example, a sprinter will work on spending as little time on the ground and increasing stride duration and/or stride length. Recording those metrics continuously during a session/game, the athlete can then visualize how fatigue, equipment, terrain, etc., impact their performance.

Another simple example is static vertical jump which is a good test and/or metric for many sports. While the sensor assembly cannot necessarily measure height directly, it can detect takeoff and landing and so it can measure the jump duration, which is directly related to height. An athlete can then test and/or track their jump performance over time.

Thus, at the most basic level, the sensor assembly 316 and/or the performance sensors 316P can be utilized to track acceleration and rotation in three dimensions. This allows the sensor assembly 316 to track the path of the foot through space, including its attitude and/or how tilted the foot is in relation to the ground (so called pitch/roll/yaw angles). In some embodiments, besides being able to count steps and cadence, the sensor assembly 316 is also usable to easily detect if the user is walking, or running, or jumping, or pivoting and record the sequence of such events (which can be used in different sports to track game play, for example). As noted above, when applied to human foot motion, the sensor assembly 316 can also measure things like foot strike pattern, stride duration (when running), ground contact duration (when running), static jump height, etc. In theory, more sport specialized metrics are also feasible.

It is appreciated that any and all of the performance characteristics measured and/or sensed by the one or more performance sensors 316P can be combined in any suitable manner to enable the generation of various statistical data and/or performance measurables for the athlete during the performance of an athletic activity or event.

Importantly, as noted above, the use of a separate sensor assembly 316 coupled to each shoe 10A, 10B (illustrated in FIG. 1) or each foot of the user can further enhance the accuracy and extent of the statistical data that can be derived from the performance characteristics that are sensed by the performance sensors 316P. For example, using two separate devices (one per foot) allows for "true" gait tracking (vs. extrapolating using only one foot). Using two devices will also enable the user to track any potential gait imbalance a lot more accurately, which is linked to biomechanics and/or injury prevention. For example, an injury and/or fatigue may cause an athlete to use one foot differently, leading to more joint/muscle stress. Thus, using two separate devices enables the user to track such imbalances with more accuracy.

It is further appreciated that in order to more effectively evaluate the various statistical data from the athletic performances, the athlete may desire to provide certain input information, such as the height and weight of the athlete. In one embodiment, the athlete may manually input such information as height and weight into the sensor assembly 316 and/or the controller 360, such as via communication with the remote device 320, such as a smartphone, a smart watch, a tablet, a computer, and/or any other suitable computing device. Alternatively, information such as the height and weight of the athlete can be provided to the sensor assembly 316 and/or the controller 360 in another suitable manner. This information can further be utilized to see the effects of people's height and weight on the performance data. It is also appreciated that any statistical data related to energy expended and/or force expended can require information such as the weight of the athlete in order for such statistical data to be accurately generated.

Moreover, the athlete can further provide such information as most recent food and/or liquid intake, latest sleeping experience, most recent exercise and extent thereof, etc. as a means to help define when the athlete may be able to experience optimum performance.

In certain embodiments or applications, the sensor assembly 316 can additionally and/or alternatively include the one or more locational sensors 316L, such as GPS sensors, for providing accurate and precise locational information that can be used by the individual wearing the lace adjuster 14 (illustrated in FIG. 1). For example, in certain non-exclusive alternative applications, the locational sensors 316L can be utilized for purposes of navigation and/or the locational sensors 316L can be utilized for purposes of tracking movements of the user. With such applications, the individual wearing the lace adjuster 14 always knows where he or she is, as well as where he or she needs to go to reach any desired destination. In such uses, the locational sensors 316L can be utilized to inhibit the person wearing the lace adjuster 14 from getting lost and/or to enable the wearer to follow a prescribed trail, such as during an adventure race or when exploring the wilderness. Moreover, as also noted above, the locational sensors 316L can offer a sense of security for someone, such as a parent or guardian, who is charged with care for and/or monitoring of the individual wearing the lace adjuster 14. In such applications, the locational information from the locational sensors 316L can be wirelessly transmitted to the remote device 320 so that the user and/or the parent or guardian can always have the accurate and precise locational information of the person wearing the lace adjuster 14.

In many embodiments, the locational sensors 316L can be used to track the movement of the user. For example, the route ran or biked can be recorded and stored for future analysis.

Other information, such as time and altitude can also be recorded and stored for future analysis. The real-time clock 352 enables any use of time to be tracked much more precisely than a comparable system that does not include a real-time clock. Stated in another manner, the real-time clock 352 enables more accurate time tracking as opposed to systems without a real-time clock, which can be prone to drift. The real-time clock 352 also obviates the need to rely on any timing mechanism that may be present in the remote device 320.

The data that is sensed by the one or more performance sensors 316P and the one or more locational sensors 316L, as well as the data input by the athlete such as via the remote device 320 (or otherwise), can be stored and/or maintained within the storage device 354 of the sensor assembly 316. The storage device 354 can have any suitable design that enables the storing and/or maintenance of information.

The transmitter 356 can be utilized to transmit the information and data that is stored within the storage device 354 (or data from the sensors 316P, 316L) to the controller 360 and/or the remote device 320, such as a remote smart phone, computer, etc. The transmitter 356 can have any suitable design to enable the effective transmission of information and data from the storage device 354 to the controller 360 and/or the remote device 320. Alternatively, the information and data that is stored within the storage device 354 can be transmitted to the controller 360 without the need for a separate transmitter 356. For example, the data can be transmitted via a removable cord to a computer or other processor.

The receiver 358 can be utilized to receive any information and data that may be transmitted by the remote device 320, such as the height and weight of the user. The receiver 358 can have any suitable design to enable the effective reception of information and data from the remote device 320, which can subsequently be transmitted to and stored within the storage device 354.

The controller 360 is electrically coupled to the one or more performance sensors 316P and/or the one or more locational sensors 316L, such as via the storage device 354 and/or the transmitter 356. The performance characteristics that are measured and/or sensed by the one or more performance sensors 316P and/or the one or more locational sensors 316L can be subsequently transmitted to and received by the controller 360, and transmitted to and received by the remote device 320, for conversion into usable statistical data, such as into one or more usable statistical data points. In one embodiment, one or more wires (not illustrated) can be utilized for transmitting the performance characteristics from the one or more performance sensors 316P and/or the one or more locational sensors 316L to the controller 360 and/or the remote device 320, such as via the storage device 354 and/or the transmitter 356. Alternatively, in another embodiment, the one or more performance sensors 316P and/or the one or more locational sensors 316L can be wirelessly coupled to the controller 360 and/or the remote device 320 for transmission of such performance characteristics.

As noted, the controller 360 can be utilized to process and/or convert the performance characteristics as measured and/or sensed by the sensors 316P, 316L into usable statistical data for the athlete. Such statistical data can further incorporate the data input by the athlete via the remote device 320 (or otherwise), and/or such statistical data can be provided independent of the data input by the athlete. The controller 360 can include one or more circuits and/or processors. In many embodiments, the controller 360 can include one or more program algorithms that can be effectively utilized to convert the information from the sensors 316P, 316L into the desired usable statistical data. In many embodiments, the remote device 320 can include a lace adjuster application 380 that can include one or more program algorithms that can be effectively utilized to convert the information from the sensors 316P, 316L into the desired usable statistical data. The program algorithms can be varied depending on the particular statistical data that is desired.

As noted above, the sensor assembly 316 can be utilized to generate various types of usable statistical data to gauge the performance of the athlete. For example, the sensor assembly 316 can be utilized to generate statistical data relating to substantially horizontal movements of the athlete, such as number of steps taken, total distance traveled, distance traveled per step (or stride length), stride duration, ground contact duration and pattern, foot acceleration and foot angle during strides (gait tracking), speed of travel, and/or horizontal burst (such as sudden acceleration from an average rate of speed). Stride length can obviously vary depending on the nature of the specific activity. For example, when you are tired or running uphill you have shorter strides, and when you are fresh and/or running downhill you have longer strides. By averaging such information, and comparing that to the nature of the course to be run, the user can use this information to estimate how long it will take to finish the run. With the addition of the real-time clock 352, this data can be further analyzed to generate statistical data for the horizontal speed of travel.

In certain embodiments, statistical data with regard to horizontal burst can be generated by comparing the performance characteristics that have been measured and/or sensed by two-axis accelerometers (measuring acceleration along the X axis or the Y axis, as well as the Z axis) to the performance characteristics as measured and/or sensed by the three-axis accelerometer (measuring acceleration along each of the X axis, the Y axis and the Z axis). By subtracting the two-axis data from the three-axis data, the acceleration data for the off-axis can be determined. By so isolating the acceleration data along the X axis and along the Y axis, the horizontal burst can be effectively determined. As noted above, horizontal burst can be defined as sudden acceleration from an average rate of speed (whether the athlete is already moving or is at a dead stop). Such burst can further be defined from any directional vector, north, south, east, west, and anywhere in between. Burst algorithms need to average the force expended or acceleration rate, over time.

In a substantially similar manner, the performance characteristics from the one or more sensors 316P, 316L can be utilized to generate statistical data regarding substantially vertical movements of the athlete, such as a number of jumps (once characteristics of what constitutes a jump are effectively established), height of jumps, jump duration and/or vertical burst (such as take-off velocity or acceleration for a jump). For example, in order to effectively determine what may constitute a jump and the height of the jump, information from a two-axis accelerometer (such as along the X axis and the Y axis) would be compared to the three-axis accelerometer, so that off axis movement (or non-true movement of the foot, when calculating height) can be removed from the analysis.

The statistical data for the substantially horizontal movements of the athlete and for the substantially vertical movements of the athlete can be combined to generate additional desired statistical data, such as an overall number of accelerations (horizontal and vertical). The number of accelerations can be defined from zero momentum, to different monitoring of constant speed or a constant g range. Subsequently, a sudden increase in speed in any direction can be effectively quantified. Such information can be more valuable in certain sports that rely more on constant accelerations, such as ice hockey, or basketball.

The three-dimensional gyrometer or other rate sensor can be utilized to analyze angular, twisting, or rotational movements of the athlete. In such analysis, it may be necessary to quantify how many degrees of angular movement or rotation from true will quantify as a twist and or rotation.

The performance characteristics that are measured and/or sensed by the one or more sensors 316P, 316L can be further utilized to generate statistical data in relation to energy expended during athletic performance (such as in kcal), and/or force expended during athletic performance (such as in psi, kpi, or other force measurements). It should be appreciated that any statistical data related to energy expended and/or force expended can require information such as the weight of the athlete in order for such statistical data to be accurately generated.

The power source 362 can provide the necessary power to the one or more performance sensors 316P, the one or more locational sensors 316L, the real-time clock 352, the storage device 354, the transmitter 356, the receiver 358 and/or the controller 360 to enable all of these components to perform their desired functions. In one embodiment, the power source 362 can include one or more batteries (not shown), such as rechargeable batteries and/or single-use batteries, which can be used to provide such necessary power. Alternatively, the power source 362 can have another suitable design.

The remote device 320 can have any suitable design for interacting with and sending data and information to and receiving data and information from the sensor assembly 316 that is coupled to the lace adjuster 14. For example, the remote device 320 can be a smartphone, a smart watch, a tablet, a computer, and/or any other suitable computing device. As illustrated in FIG. 3, the remote device 320 can include one or more of a device body 364, a connector port 366 that is formed into the device body 364, an input mechanism 368, a transmitter 370 (illustrated as a box in phantom), a receiver 372 (illustrated as a box in phantom), a storage device 374 (illustrated as a box in phantom), a display screen 376, a controller 378 (illustrated as a box in phantom), a lace adjuster application 380 (illustrated as a box in phantom), and a power source 382. Alternatively, the remote device 320 can have another suitable design, which can comprise more or fewer components than those specifically illustrated in FIG. 3.

As shown, in one embodiment, the device body 364 can provide a housing for the input mechanism 368, the transmitter 370, the receiver 372, the storage device 374, the display screen 376, the controller 378, the lace adjuster application 380, and the power source 382. The design of the device body 364 can be varied and/or the device body 364 can have any suitable shape.

In certain embodiments, the device body 364 can include the connector port 366, such as a USB port or other suitable connection, that enables the user to simply and directly connect the lace adjuster 14 to the remote device 320 to quickly and easily download any and all data generated through use of the sensor assembly 316. With such design, the user is able to view any and all such data at a later time of convenience to the user.

The input mechanism 368 provides a means by which the user can input any desired information into the feedback assembly 15 (illustrated in FIG. 1) and/or the sensor assembly 216 to aid in deriving the desired statistical data. For example, in certain implementations, the input mechanism 368 can be utilized by the user to input information such as the height and weight of the user, which can subsequently be used for purposes of deriving statistical data related to energy expended and force expended during an athletic performance. Additionally, or in the alternative, the input mechanism 368 can be utilized by the user to input additional information.

The transmitter 370 can be utilized to transmit any desired information and data from the remote device 320 to the receiver 358 of the sensor assembly 316. For example, the transmitter 370 can be utilized to transmit any derived statistical data, as well as any data and information that was input through the input mechanism 368 from the remote device 320 to the sensor assembly 316. The transmitter 370 can have any suitable design to enable the effective transmission of information and data from the remote device 320 to the sensor assembly 316.

The receiver 372 is configured to receive any data and information, such as any performance characteristics that have been sensed by the one or more performance sensors 316P and/or the one or more locational sensors 316L, that is transmitted from the sensor assembly 316 to the remote device 320. The receiver 372 can have any suitable design for purposes of receiving the data and information from the sensor assembly 316.

The storage device 374 is utilized to store any data and information that is derived and/or utilized within the sensor assembly 316. For example, the storage device 374 can be utilized to store any data and information that has been transmitted from the sensor assembly 316 to the remote device 320. In some embodiments, the storage device 374 can further be utilized to store any statistical data that has been derived from the data and information that has been transmitted from the sensor assembly 316 to the remote device 320. In certain embodiments, the storage device 374 can also be used to store any data and information that has been input by the user via the input mechanism 368.

The display screen 376 can be a video screen, of any suitable size and shape, which is utilized to display any and all data and information that is sensed, input and/or generated within the sensor assembly 316. More specifically, the display screen 376 can be utilized to display any performance characteristics that are measured and/or sensed by the one or more performance sensors 316P and/or the one or more locational sensors 316L, and data or information that is input by the athlete via the input mechanism 368 (or otherwise), and any statistical data points that may be generated from the sensed and input data by the controller 378.

The controller 378 is electrically coupled to the one or more performance sensors 316P and/or the one or more locational sensors 316L, such as via the storage device 374 and/or the receiver 372 incorporated into the remote device 320, as well as the storage device 354 and/or the transmitter 356 incorporated within the assembly body 350 of the sensor assembly 316. In certain embodiments, the performance characteristics that are measured and/or sensed by the one or more performance sensors 316P and/or the one or more locational sensors 316L are subsequently transmitted to and received by the controller 378 for conversion into usable statistical data, such as into one or more usable statistical data points. The controller 378 can include one or more processors or circuits for providing such functionality.

As shown in FIG. 3, in one embodiment, the lace adjuster application 380 can be incorporated into the controller 378 for enabling the user to easily and consistently use the feedback assembly 15 (and/or the feedback system when the user has separate lace adjuster assemblies 13 coupled to each shoe 10A, 10B) that is built into the lace adjuster assembly 13. The controller 378 and/or the lace adjuster application 380 can include an algorithm that is specifically configured to enable the derivation of any and all desired statistical data based on the data and information that is received within the controller 378 and which can be accessed by the lace adjuster application 380.

In some embodiments, the lace adjuster application 380 can be usable so that any desired data and information can be uploaded to a website for analysis, comparison, storage, or other suitable purposes.

In certain embodiments, the remote device 320 will have Bluetooth capabilities, and have a social media aspect where customers can communicate and compare their statistical data to one or more professional athletes. It should be appreciated that this comparison of statistical data can embody many different sports.

The power source 382 can provide the necessary power to the remote device 320 for enabling the desired functionality. More specifically, the power source 382 can provide the necessary power to each of the input mechanism 368, the transmitter 370, the receiver 372, the storage device 374, the display screen 376, the controller 378 and the lace adjuster application 380 for purposes of enabling the desired functionality. In one embodiment, the power source 382 can include one or more batteries, such as rechargeable batteries and/or single-use batteries, which can be used to provide such necessary power. Alternatively, the power source 382 can have another suitable design.

Figure 4:
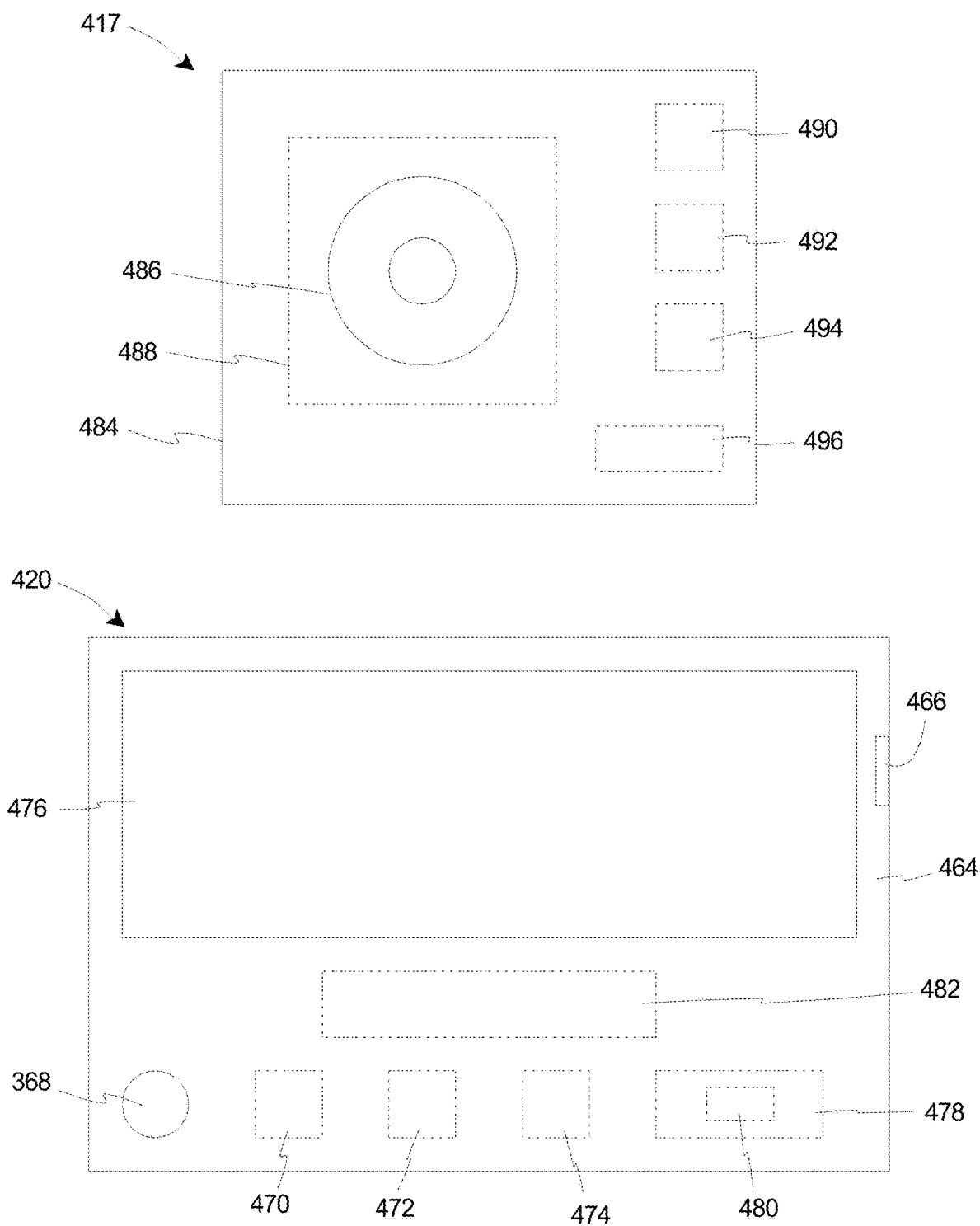
FIG. 4 is a simplified schematic illustration of an embodiment of the image capturing assembly.

FIG. 4 is a simplified schematic illustration of an embodiment of the image assembly 417. FIG. 4 further includes a simplified schematic illustration of an embodiment of the remote device 420 that can be utilized in conjunction with and/or as part of the image assembly 417. As shown in FIG. 4, the remote device 420 can be substantially identical to, or actually the same remote device 320 that is utilized in conjunction with and/or as part of the sensor assembly 316 illustrated in FIG. 3. This image assembly 417 can be used in each of the lace adjuster assemblies 13 illustrated in FIG. 1.

The design of the image assembly 417 can be varied. For example, as illustrated in FIG. 4, the image assembly 417 can be a digital camera that includes an assembly body 484, an optical assembly 486, a capturing system 488 (illustrated in phantom), a storage device 490 (illustrated as a box in phantom), a transmitter 492 (illustrated as a box in phantom), a controller 494 (illustrated as a box in phantom), and a power source 496 (illustrated as a box in phantom). The design of these components can be varied to suit the design requirements and type of image assembly 417. Alternatively, the image assembly 417 can be designed without one or more of these components.

In certain alternative embodiments, the image assembly 417 can be designed to capture still images of the athlete during an athletic performance, and/or the image assembly 417 can be designed to capture video image sequences of the athlete during an athletic performance. In some embodiments, the image assembly 417 can be activated manually by the athlete or other user of the image assembly 417, and/or the image assembly 417 can be designed to be automatically activated based on the occurrence of certain movements or events.

As shown in this embodiment, each of the optical assembly 486, the capturing system 488, the storage device 490, the transmitter 492, the controller 494 and the power source 496 can be coupled to and/or positioned substantially within the assembly body 484. Alternatively, one or more of the components can be provided remotely from the assembly body 484.

The assembly body 484 can be rigid and support and/or provide a housing for at least some of the other components of the image assembly 417, such as the optical assembly 486, the capturing system 488, the storage device 490, the transmitter 492, the controller 494 and the power source 496. In one embodiment, the assembly body 484 includes a generally rectangular-shaped hollow body that forms a cavity that receives and retains such components of the image assembly 417. Alternatively, the assembly body 484 can have another suitable shape.

The optical assembly 486 can include a single lens or a combination of lenses that work in conjunction with each other to focus light onto the capturing system 488. As the image assembly 417 is coupled to the lace adjuster 14 (illustrated in FIG. 1), the optical assembly 486 can be positioned and oriented such that the lenses focus light onto the capturing system 488 from any desired direction. For example, in one embodiment, the optical assembly 486 can be positioned and oriented such that the lenses focus light onto the capturing system 488 from a generally vertical direction, such as when the optical assembly 486 is directed in a generally upward direction from the lace adjuster 14. Additionally, and/or alternatively, the optical assembly 486 can be positioned and oriented such that the lenses focus light onto the capturing system 488 from a generally horizontal direction and/or at any desired angle between the vertical and horizontal directions.

In one embodiment, the image assembly 417 includes an autofocus assembly (not shown) including one or more lens movers that move one or more lenses of the optical assembly 486 in or out until the sharpest possible image of a main subject, such as the athlete, is received by the capturing system 488.

The capturing system 488 captures information for the still images and/or the video sequences of the athlete during their athletic performance. The design of the capturing system 488 can vary according to the type of image assembly 417. For a digital-type camera, the capturing system 488 can include an image sensor (not shown) and a filter assembly (not shown).

The still images and/or video sequences that are captured by the capturing system 488 can be stored and/or maintained within the storage device 490 of the image assembly 417. The storage device 490 can have any suitable design that enables the storing of such still images and/or video sequences.

The transmitter 492 can be utilized to transmit the still images and/or video sequences that are stored within the storage device 490 to the controller 494 and/or to the remote device 420, such as a television, a smart phone, a computer, etc. The transmitter 492 can have any suitable design to enable the effective transmission of the still images and/or video sequences from the storage device 490 to the controller 494 and/or to the remote device 420. Alternatively, the still images and/or video sequences that are stored within the storage device 490 can be transmitted to the controller 494 without the need for a separate transmitter 492.

The controller 494 is electrically connected to and controls the operation of the electrical components of the image assembly 417. The controller 494 can include one or more processors and circuits, and the controller 494 can be programmed to perform one or more of the functions described herein. For example, the controller 494 can be utilized to perform various processing steps on the still images and/or video sequences of the athlete that have been captured by the capturing system 488.

As shown, the controller 494 can be positioned within the assembly body 484. In some embodiments, the controller 494 and/or a separate, second controller 478 can be positioned remotely from the image assembly 417, such as within the remote device 420.

The power source 496 can provide the necessary power to the optical assembly 486, the capturing system 488, the storage device 490, the transmitter 492 and/or the controller 494 to enable all of these components to perform their desired functions. In one embodiment, the power source 496 can include one or more batteries, such as rechargeable batteries and/or single-use batteries, which can be used to provide such necessary power. Alternatively, the power source 496 can have another suitable design.

It should be appreciated that in embodiments of the lace adjuster assembly 13 (illustrated in FIG. 1) that include both the image assembly 417 and the sensor assembly 316, the transmitter 492, the controller 494 and/or the power source 496 can be used in common for each of the image assembly 417 and the sensor assembly 316. Alternatively, in such embodiments, the image assembly 417 and the sensor assembly 316 can include and utilize separate transmitters, controllers and/or power sources.

In one embodiment of the lace adjuster assembly 13 that includes both the image assembly 417 and the sensor assembly 316, the various components of the image assembly 417 and the sensor assembly 316 can be coupled to and/or positioned substantially within a common assembly body.

In some embodiments, as shown in FIG. 4 and as noted above, the image assembly 417 can be wirelessly coupled to the remote device 420. For example, in certain embodiments, the transmitter 492 of the image assembly 417 can be designed to wirelessly transmit the still images and video sequences of the athlete to the remote device 420 via Wi-Fi, Bluetooth, or other suitable wireless technique.

The design of the remote device 420 can be varied. As noted above, the remote device 420 can be substantially identical to, or actually the same remote device 320 that is utilized in conjunction with and/or as part of the sensor assembly 316 illustrated in FIG. 3. In particular, as illustrated, the remote device 420 can again include one or more of a device body 464, a connector port 466 that is formed into the device body 464, an input mechanism 468, a transmitter 470 (illustrated as a box in phantom), a receiver 472 (illustrated as a box in phantom), a storage device 474 (illustrated as a box in phantom), a display screen 476, a controller 478 (illustrated as a box in phantom), a lace adjuster application 480 (illustrated as a box in phantom), and a power source 482. Each of the noted components have essentially the same design and functionality as described in detail herein above in relation to FIG. 3.

However, the use and application of the various components can be modified slightly for purposes of interacting as desired with the image assembly 417. For example, the data and information being transmitted from the image assembly 417 to the remote device 420 is somewhat different than the data and information being transmitted between the sensor assembly 316 and the remote device 320. More particularly, the image assembly 417 is configured to capture any desired images, such as still images and/or video images, that can be subsequently transmitted to the remote device 420. Such images can then be stored in the storage device 474 and/or displayed on the display screen 476 as desired.

Figure 5:
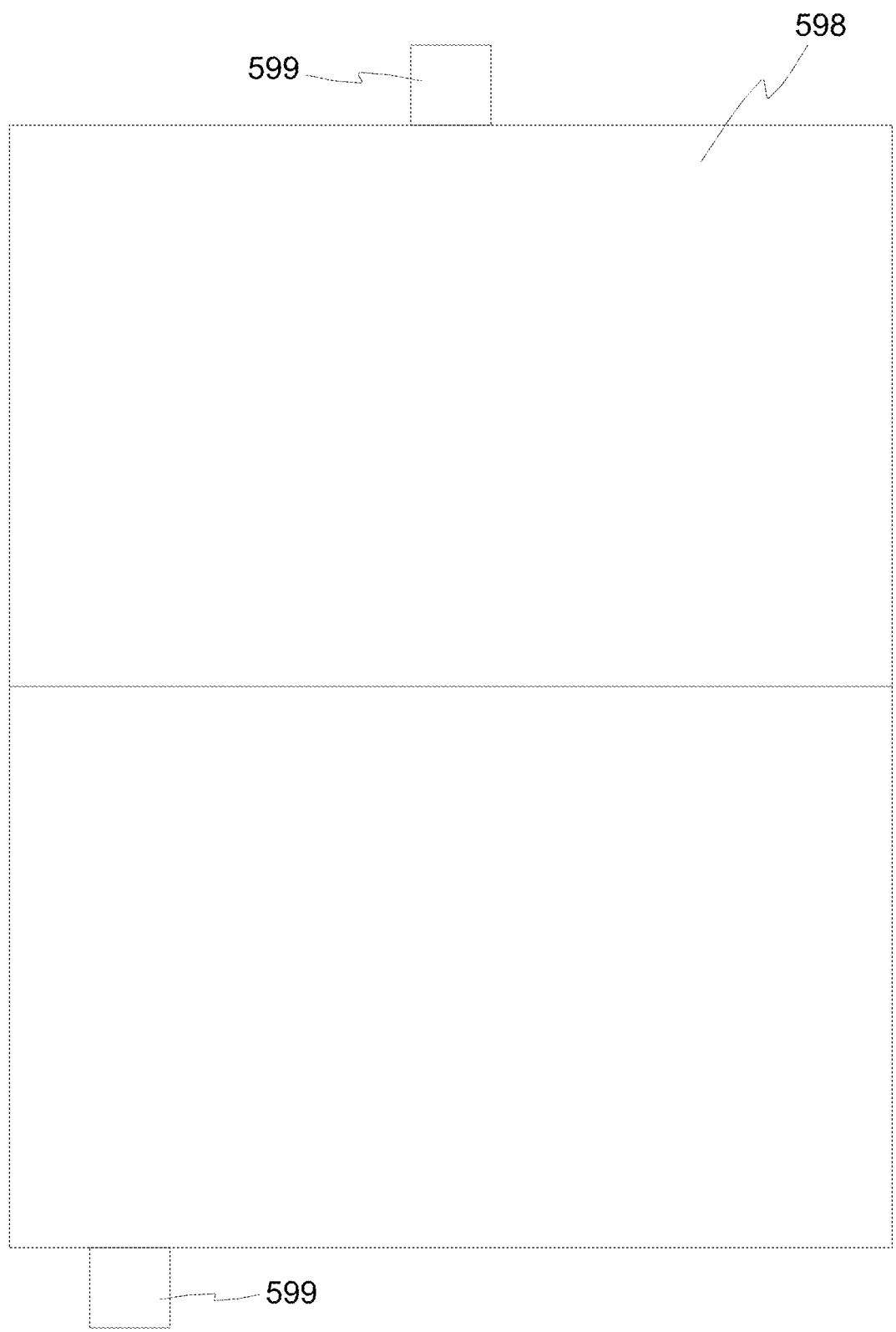
FIG. 5 is a simplified top view of an athletic field that is usable by a user of the lace adjuster.

FIG. 5 is a simplified top view of an area 598 that is usable by a user of the lace adjuster assembly 13 (illustrated in FIG. 1). As noted above, in some embodiments, the lace adjuster assembly 13 can include a feedback assembly 15 (illustrated in FIG. 1) that can include a locational sensor 216L (illustrated in FIG. 2F) such as a GPS sensor within the sensor assembly 216 (illustrated in FIG. 2F) in order to provide locational and/or tracking information for the user. It is appreciated that in order to obtain the most precise and accurate locational and tracking information, it can be desired to include more than one or more additional sensors 599, such as two, three, or four sensors, that are spaced apart from one another and positioned near the area 598. In such arrangement, the overall system is better able to determine and track the actual precise location of the lace adjuster assembly 13. It is further appreciated that if the user wears a separate lace adjuster assembly 13 on each shoe 10A, 10B (illustrated in FIG. 1), then the locational and tracking information provided by the feedback system can be even more precise and accurate.

The type of area 598 can vary. For example, the area 598 can be an athletic field such as a football or soccer field; a court such as a tennis or basketball court; or another type of area 598.

In the present design, the user of the lace adjuster assembly 13 can be participating in an event in the area 598, and the one or more additional sensors 599 can be used to improve the locational information of the lace adjuster assembly 13.

In the embodiment shown in FIG. 5, the area 598 can include two additional sensors 599. For example, as provided above, the lace adjuster assembly 13 and/or the locational sensors 216L of the sensor assembly 216 can include a GPS sensor. Each additional sensor 599 can also include a GPS sensor (or GPS beacon) to determine their precise location relative to the area 598 and relative to the locational sensors 216L of the lace adjuster assembly 13. The GPS information from these additional sensor(s) 599 can be relayed to the lace adjuster assembly 13 and/or to the remote device 220 (illustrated in FIG. 2F) to improve the measurement information of the lace adjuster assembly 13. As non-exclusive examples, the lace adjuster assembly 13 can be electrically connected via WI-FI or Bluetooth to the additional sensors 599.

In some embodiments, the additional sensors 599 can be used to monitor the relative position of the lace adjuster assembly 13 over time. For example, the additional sensors 599 can include one or more systems that monitor the relative position of the lace adjuster assembly 13 over time, or generate signals that can be used by the lace adjuster assembly 13 to monitor position.

In certain embodiments, the additional sensors 599 can generate GPS signals which can be utilized by the lace adjuster assembly 13 to provide more accurate and precise locational and tracking information for the user of the lace adjuster assembly 13. It is appreciated that the additional sensors 599 can be positioned in any suitable manner relative to the area 598, such as on and/or near the area 598, in order to provide such information for the user. As shown, the additional sensors 599 will typically be provided in fixed positions relative to the area 598. Thus, during use, each of the additional sensors 599 can provide precise, locational and/or tracking information. The additional sensors 599 can also be electronically linked to one another and/or can communicate with one another, such as wirelessly or with a wired connection.

With this design, each of the additional sensor(s) 599 can communicate, such as wirelessly, in any suitable manner, with the locational sensor 216L, such as the GPS sensor, within the sensor assembly 216 and/or the feedback assembly 15 as the user moves on or about the area 598. Based on the communications among the additional sensor(s) 599 and the locational sensor 216L within the sensor assembly 216 and/or the feedback assembly 15 of the lace adjuster assembly 13 on the shoelace 12 (illustrated in FIG. 1) of the shoes 10A, 10B of the user, precise locational and/or tracking information of the user can be known at all times when the user is using the area 598. In such manner, the user can obtain desired information regarding statistical data, such as during an athletic performance, in order to effectively gauge various aspects of their athletic performance.

It is understood that although a number of different embodiments of the lace adjuster assembly 13, the lace adjuster 14 and the feedback assembly 15 have been illustrated and described herein, one or more features of any one embodiment can be combined with one or more features of one or more of the other embodiments, provided that such combination satisfies the intent of the present invention.

While a number of exemplary aspects and embodiments of the lace adjuster assembly 12, the lace adjuster 14 and the feedback assembly 15 have been shown and disclosed herein above, those of skill in the art will recognize certain modifications, permutations, additions, and sub-combinations thereof. It is therefore intended that the lace adjuster assembly 12, the lace adjuster 14 and the feedback assembly 15 shall be interpreted to include all such modifications, permutations, additions, and sub-combinations as are within their true spirit and scope, and no limitations are intended to the details of construction or design herein shown.

What is claimed is:

1. A lace adjuster system that is adapted to selectively adjust a first shoelace of a first shoe of a user and to selectively adjust a second shoelace of a second shoe of the user, the lace adjuster system comprising:
a first lace adjuster assembly including (i) a first lace adjuster that is adapted to selectively adjust the first shoelace of the first shoe of the user; and (ii) a first feedback assembly that is mechanically coupled to the first lace adjuster, the first feedback assembly measuring statistical data of the user during an athletic performance, the first feedback assembly including a first sensor assembly including a first performance sensor that is mechanically coupled to the first lace adjuster and that senses a first performance characteristic of the user during the athletic performance; and a first controller that is electrically coupled to the first performance sensor, the first controller including a first processor, the first controller receiving the first performance characteristic from the first performance sensor and generating a first statistical data point that is based at least in part on the first performance characteristic; and
a second lace adjuster assembly including (i) a second lace adjuster that is adapted to selectively adjust the second shoelace of the second shoe of the user; and (ii) a second feedback assembly that is mechanically coupled to the second lace adjuster, the second feedback assembly measuring statistical data of the user during the athletic performance, the second feedback assembly including a second sensor assembly including a second performance sensor that is mechanically coupled to the second lace adjuster and that senses a second performance characteristic of the user during the athletic performance; and a second controller that is electrically coupled to the second performance sensor, the second controller including a second processor, the second controller receiving the second performance characteristic from the second performance sensor and generating a second statistical data point that is based at least in part on the second performance characteristic.

2. The lace adjuster system of claim 1 wherein the first controller is the same as the second controller.

3. The lace adjuster of claim 1 wherein the first controller and the second controller are each within a remote device.

4. The lace adjuster system of claim 1 wherein the first statistical data point and the second statistical data point are combined by one of the first controller and the second controller to generate a combined statistical data point having enhanced accuracy relative to the first statistical data point and the second statistical data point.

5. The lace adjuster system of claim 4 wherein the first feedback assembly further includes a first storage device for storing the combined statistical data point.

6. The lace adjuster system of claim 5 wherein the first storage device is mechanically coupled to the first lace adjuster; and wherein the first sensor assembly further includes a first transmitter for transmitting the combined statistical data point from the first storage device to a remote device.

7. The lace adjuster system of claim 6 wherein the first transmitter transmits the combined statistical data point from the first storage device to the remote device via a wireless connection.

8. The lace adjuster system of claim 6 wherein the first transmitter transmits the combined statistical data point from the first storage device to the remote device via a wired connection.

9. The lace adjuster system of claim 1 wherein the first performance sensor senses one or more of a horizontal movement, a vertical movement and an angular movement of the user during the athletic performance.

10. The lace adjuster system of claim 9 wherein the first performance sensor is one of a two-axis accelerometer, a three-axis accelerometer, and a three-axis gyrometer.

11. The lace adjuster system of claim 9 wherein the first performance sensor includes a first magnetometer that measures a magnitude and direction of magnetic fields at a point in space in relation to a position of the user during the athletic performance.

12. The lace adjuster system of claim 9 wherein the second performance sensor senses the one or more of a horizontal movement, a vertical movement and an angular movement of the user during the athletic performance.

13. The lace adjuster system of claim 12 wherein the second performance sensor is the one of a two-axis accelerometer, a three-axis accelerometer, and a three-axis gyrometer.

14. The lace adjuster system of claim 12 wherein the second performance sensor includes a second magnetometer that measures a magnitude and direction of magnetic fields at a point in space in relation to a position of the user during the athletic performance.

15. The lace adjuster system of claim 1 wherein the first feedback assembly further includes a first image capturing assembly that captures a first image of the user during the athletic performance.

16. The lace adjuster system of claim 15 wherein the second feedback assembly further includes a second image capturing assembly that captures a second image of the user during the athletic performance.

17. The lace adjuster system of claim 1 wherein the first sensor assembly further includes a first locational sensor for providing precise locational information of the user; and wherein the locational information from the first locational sensor is wirelessly transmitted to a remote device.

18. The lace adjuster system of claim 17 wherein the second sensor assembly further includes a second locational sensor for providing precise locational information of the user; and wherein the locational information from the second locational sensor is wirelessly transmitted to the remote device.

19. The lace adjuster system of claim 1 wherein the first lace adjuster includes (i) a body assembly having a first body member and a second body member that is coupled to the first body member, the body assembly defining a cavity, and (ii) a lace end retainer that is connected to the body assembly, the lace end retainer being configured to selectively retain at least a portion of the shoelace, the lace adjuster being selectively movable between an unlocked configuration and a locked configuration, wherein the shoelace is adjustable relative to the lace adjuster when the lace adjuster is in the unlocked configuration, and wherein the shoelace is resiliently retained by the lace adjuster and is inhibited from being adjusted relative to the lace adjuster when the lace adjuster is in the locked configuration; and wherein the first performance sensor is positioned within the cavity.

20. A lace adjuster system that is adapted to selectively adjust a first shoelace of a first shoe of a user and to selectively adjust a second shoelace of a second shoe of the user, the lace adjuster system comprising:

a first lace adjuster assembly including (i) a first lace adjuster that is adapted to selectively adjust the first shoelace of the first shoe of the user; and (ii) a first feedback assembly that is mechanically coupled to the first lace adjuster, the first feedback assembly measuring statistical data of the user during an athletic performance, the first feedback assembly including a first sensor assembly including a first performance sensor that is mechanically coupled to the first lace adjuster and that senses a first performance characteristic of the user during the athletic performance; and a first controller that is electrically coupled to the first performance sensor, the first controller including a first processor, the first controller receiving the first performance characteristic from the first performance sensor and generating a first statistical data point that is based at least in part on the first performance characteristic; and a second lace adjuster assembly including (i) a second lace adjuster that is adapted to selectively adjust the second shoelace of the second shoe of the user; and (ii) a second feedback assembly that is mechanically coupled to the second lace adjuster, the second feedback assembly measuring statistical data of the user during the athletic performance, the second feedback assembly including a second sensor assembly including a second performance sensor that is mechanically coupled to the second lace adjuster and that senses a second performance characteristic of the user during the athletic performance; and a second controller that is electrically coupled to the second performance sensor, the second controller including a second processor, the second controller receiving the second performance characteristic from the second performance sensor and generating a second statistical data point that is based at least in part on the second performance characteristic;

wherein the first statistical data point and the second statistical data point are combined by one of the first controller and the second controller to generate a combined statistical data point having enhanced accuracy relative to the first statistical data point and the second statistical data point;

wherein the first feedback assembly further includes a first storage device for storing the combined statistical data point;

wherein the first storage device is mechanically coupled to the first lace adjuster, the first sensor assembly further including a first transmitter for transmitting the combined statistical data point from the first storage device to a remote device;

wherein the first performance sensor senses one or more of a horizontal movement, a vertical movement and an angular movement of the user during the athletic performance;

wherein the second performance sensor senses the one or more of a horizontal movement, a vertical movement and an angular movement of the user during the athletic performance;

wherein the first feedback assembly includes a first image capturing assembly that captures a first image of the user during the athletic performance;

wherein the second feedback assembly includes a second image capturing assembly that captures a second image of the user during the athletic performance;

wherein the first sensor assembly further includes a first locational sensor for providing precise locational information of the user, the locational information from the first locational sensor being wirelessly transmitted to a remote device; and wherein the second sensor assembly further includes a second locational sensor for providing precise locational information of the user, the locational information from the second locational sensor being wirelessly transmitted to the remote device.

* * * * *